US009177047B2

(12) United States Patent
Xie et al.

(10) Patent No.: US 9,177,047 B2
(45) Date of Patent: Nov. 3, 2015

(54) SYSTEM, METHOD AND COMPUTER PROGRAM PRODUCT FOR INFORMATION SORTING AND RETRIEVAL USING A LANGUAGE-MODELING KERNAL FUNCTION

(75) Inventors: Ying Xie, Kennesaw, GA (US); Vijay V. Raghavan, Lafayette, LA (US)

(73) Assignee: Araicom Research LLC, Wilmington, DE (US)

( * ) Notice: Subject to any disclaimer, the term of this patent is extended or adjusted under 35 U.S.C. 154(b) by 156 days.

(21) Appl. No.: 13/166,011

(22) Filed: Jun. 22, 2011

(65) Prior Publication Data

US 2011/0270829 A1 Nov. 3, 2011

Related U.S. Application Data

(63) Continuation of application No. 12/142,342, filed on Jun. 19, 2008, now abandoned, which is a continuation of application No. PCT/US2006/048571, filed on Dec. 20, 2006.

(60) Provisional application No. 60/752,756, filed on Dec. 20, 2005.

(51) Int. Cl.
*G06F 7/00* (2006.01)
*G06F 17/30* (2006.01)

(52) U.S. Cl.
CPC ...... *G06F 17/3069* (2013.01); *G06F 17/30648* (2013.01); *G06F 17/30693* (2013.01); *G06F 17/30265* (2013.01)

(58) Field of Classification Search
USPC ............ 707/999.102, 999.101, 678, 737, 609
See application file for complete search history.

(56) References Cited

U.S. PATENT DOCUMENTS

| 6,167,398 | A | 12/2000 | Wyard et al. |
| 6,665,640 | B1 * | 12/2003 | Bennett et al. ............... 704/257 |
| 7,277,854 | B2 * | 10/2007 | Bennett et al. ............... 704/257 |
| 7,409,335 | B1 * | 8/2008 | Horvitz et al. ................. 704/9 |
| 7,430,505 | B1 * | 9/2008 | Horvitz et al. ................. 704/9 |
| 7,519,529 | B1 * | 4/2009 | Horvitz ......................... 704/7 |
| 2001/0042061 | A1 | 11/2001 | Evans |

(Continued)

OTHER PUBLICATIONS

Caid, W. R. et al., *Learned Vector-Space Models for Document Retrieval*, Information Processing Management, vol. 31, No. 3, pp. 419-429, 1995.

(Continued)

*Primary Examiner* — Hosain Alam
*Assistant Examiner* — Eliyah S Harper
(74) *Attorney, Agent, or Firm* — Alston & Bird LLP

(57) ABSTRACT

Various embodiments provide a system, method, and computer program product for sorting and/or selectively retrieving a plurality of documents in response to a user query. More particularly, embodiments are provided that convert each document into a corresponding document language model and convert the user query into a corresponding query language model. The language models are used to define a vector space having dimensions corresponding to terms in the documents and in the user query. The language models are mapped in the vector space. Each of the documents is then ranked, wherein the ranking is based at least in part on a position of the mapped language models in the vector space, so as to determine a relative relevance of each of the plurality of documents to the user query.

23 Claims, 14 Drawing Sheets

(56) References Cited

U.S. PATENT DOCUMENTS

| | | | |
|---|---|---|---|
| 2002/0161796 A1* | 10/2002 | Sylthe | 707/500 |
| 2004/0024720 A1* | 2/2004 | Fairweather | 706/46 |
| 2005/0114757 A1* | 5/2005 | Sahota et al. | 715/501.1 |
| 2006/0080315 A1* | 4/2006 | Mitchell | 707/6 |
| 2006/0212413 A1* | 9/2006 | Rujan et al. | 706/20 |

OTHER PUBLICATIONS

Lee, D. L. et al., *Document Ranking and the Vector-Space Model*, IEEE, Mar./Apr. 1997, pp. 67-75.

\* cited by examiner

SYSTEM, METHOD AND COMPUTER PROGRAM PRODUCT FOR INFORMATION SORTING AND RETRIEVAL USING A LANGUAGE-MODELING KERNAL FUNCTION

CROSS-REFERENCE

This application is a continuation of co-pending U.S. application Ser. No. 12/142,342, filed Jun. 19, 2008, which is a continuation of International Application No. PCT/US2006/048571, filed Dec. 20, 2006, which is a non-provisional of and claims priority to U.S. Application No. 60/752,756, filed Dec. 20, 2005, the contents each of which are incorporated by reference in entirety.

BACKGROUND

1. Field of the Invention

The present invention relates to the field of information retrieval (IR) systems and, more particularly, provides an IR system, method, and computer program product that advantageously provides a kernel function capable of utilizing language modeling approaches and vector space modeling (VSM) to optimize information sorting and retrieval.

2. Description of Related Art

Information retrieval (IR) has changed considerably in the past decades with the expansion of the Web (World Wide Web) and the advent of modern and inexpensive graphical user interfaces and mass storage devices. The IR area is no longer limited to traditional applications such as indexing text and searching for useful documents in a collection. Rather, research in IR includes modeling, document classification and categorization, systems architecture, user interfaces, data visualization, filtering, languages, etc. As a result of such changes, traditional IR methods and models are faced with increasing challenges, such as how to modify and improve the existing IR models to dynamically meet various user information needs, and how to fully utilize the currently available IR approaches in different stages of the IR process to provide most effective and efficient retrieval performances, etc.

A typical IR process starts with a document indexing step at which each document or crawled web page in a collection is transformed into an instance of a certain type of document representation and stored in an indexed document database. On the other hand, a user information need is formulated as a query to be submitted to and parsed by an IR system (i.e., search engine). In response to the query, a document retrieval or ranking step is triggered to evaluate the relevance between the query representation and each of the document representations stored in the document database and rank all the documents based on their respective relevance values. Typically, the top n ranked documents would be presented as the initial retrieval results to invite a user relevance feedback, i.e., the user can specify which documents are relevant and which are non-relevant. Based upon the user feedback, the IR system (i.e., search engine) may run a certain machine learning algorithm to determine a boundary that separates the relevant results from non-relevant ones. Through the learned boundary, the IR system can either refine the query representation or re-measure the relevance values, and thereby present better retrieval results to the user.

As a traditional information retrieval method, Vector Space Model (VSM) has been the most widely utilized computational model of document retrieval or ranking since it was proposed in 1975. Today, most web search engines adopt strategies derived from the VSM. The VSM is built upon an assumption that all documents or queries can be properly represented as vectors in a vector space. By providing a way to measure similarity between any two document vectors or a document vector and a query vector, the VSM allows documents to be ranked according to their respective similarity values. The documents ranked by the VSM, coupled with user relevance feedback, will enable different machine learning algorithms to draw different optimal decision boundaries between relevant (positive) and non-relevant (negative) results. Among the various learning machines, the Support Vector Machine (SVM) is a highly effective one that generates the optimal decision boundary with the maximal margin of separation between the positive examples and negative examples. Despite the wide use of the VSM, one problem in applying this model is, the model itself does not specify how to determine a vector space or how to represent documents and queries as vectors, which requires supplementary methods to be used for resolving those issues. Among existing methods, however, there is no systematic but heuristic way to construct a vector space and represent document or query vectors. In addition, the measured similarity values between documents should vary with the change in user information needs. In other words, the vector space, where documents are represented as vectors, is expected to be dynamically determined from different user information needs. But how to dynamically determine an optimal vector space remains unexplored.

Proposed more recently as an alternative to traditional IR methods, the language-modeling approach integrates document indexing and document retrieval into a single model. This approach infers a language model for each document, estimates the probability of generating the query according to each of these models, and then ranks the documents according to these probabilities. A language model is built from collection statistics such as term frequency in a document, document length, and term frequency in the collection of documents. With the ability to utilize those statistics in a well-interpreted systematic way, the language-modeling approach outperforms the basic vector space model with TFIDF (term frequency-inverse document frequency) indexing scheme on several known document collections (such as the TREC collections, for example). However, the language-modeling approach does not provide an explicit model for relevance, which makes it conceptually difficult to incorporate any relevance feedback mechanism for improving retrieval results. In order to overcome this obstacle, some additional IR systems provide a model based feedback mechanism to estimate a query model (i.e., term distribution from which the query is generated) estimated from the positive feedback (relevant documents), and then rank the documents based on the divergences between each query model and document model. In such model-based feedback mechanisms, the language-modeling approach gains some limited learning ability. However, the model based feedback mechanism is unable to utilize statistics from negative feedbacks (i.e., the selection of non-relevant documents). Therefore, further enhancement of the language-modeling technique is needed in order to fully incorporate the advantages brought by machine learning algorithms, such as run by the SVM.

In light of the above, a need exists for an integrated information retrieval framework that can incorporate advantages provided by both the VSM and the language model, such as systematically representing documents as vectors, dynamically determining an optimal vector space based on user information needs, utilizing document statistics, collection statistics, and relevance statistics in a systematic rather than heuristic way, and utilizing both positive and negative feedback to interface with a machine learning algorithm (such as the SVM, for example).

BRIEF SUMMARY

The needs outlined above are met by embodiments of the present invention which, in various embodiments, provide systems, methods, and computer program products that overcome many of the technical problems discussed above, as well other technical problems, with regard to the systematic sorting of documents or other information based on relevance to a user information need, information request, or other user information demand, hereinafter referred to collectively as a user query or simply a query. According to one embodiment, the system comprises a data source comprising a plurality of documents and a host computing element in communication with the data source and configured to receive an initial user input comprising the user query. The host computing element converts each of the plurality of documents into a corresponding document language model, wherein the document language model is associated with a distribution of document terms present in the plurality of documents and with a distribution of a plurality document terms present in each of the plurality of documents. The host computing element further converts the user query into a corresponding query language model, wherein the query language model is associated with a distribution of query terms present in the user query and a distribution of a plurality document terms present in the plurality of documents. The host computing element further defines a kernel function that evaluates the similarity/distance relationship between document language models under the influence of the query language model. In addition, the host computing element further maps each of the document language model and the query language model into a vector space determined by the kernel function. Then the host computing element conducts an initial ranking of the documents based at least in part on a similarity relationship between each of the plurality of document language models and the query language model in the vector space determined by the kernel function to determine a relative relevance of each of the plurality of documents to the user query.

In some system embodiments, the host computing element converts each of the plurality of documents into a corresponding document language model by analyzing the distribution of document terms present in the documents to determine a statistical measure of a prevalence of document terms in each document and/or a prevalence of document terms in the documents. Furthermore, in some system embodiments, the host computing element converts the user query into a corresponding query language model by analyzing the distribution of query terms present in the user query relative to the distribution of document terms present in the documents.

Some system embodiments further comprise a user interface in communication with said host computing element and configured to receive the initial user input, the user interface being further configured to display the ranked plurality of documents. In some embodiments, the user interface and/or the host computing element may be further configured to receive and/or estimate relevance feedback (positive and negative feedback inputs comprising selections samples of relevant and non-relevant documents). In some embodiments, the host computing element may be configured to receive the relevance feedback though a user interface wherein the user explicitly selects samples of relevant documents and samples of non-relevant documents from the initial ranking. In other embodiments, the host computing element may be configured to receive and/or estimate relevance feedback by monitoring user browsing (or reading, printing) behaviors via the user interface. In such system embodiments, the host computing element may be further configured to conduct a double learning strategy to re-rank all the documents. In such system embodiments, the host computing element may refine the query language model from the relevant samples (positive documents) as the first learning. In some such embodiments, refining the query language model may further comprise analyzing a distribution of the plurality document terms present in the plurality of sample relevant documents in the positive feedback input and a distribution of the plurality query terms in the plurality of sample relevant documents in the positive feedback input. Then the newly refined query language model determines a new kernel function (language modeling kernel) by replacing the query language model of the old kernel function, such that the newly determined kernel function may map each of the document language model to a new vector space. Then, in a second learning phase, the host computing element is configured to generate a decision boundary in the newly determined vector space between the document language models corresponding to the relevant documents and the document language models corresponding to the non-relevant documents. The decision boundary may be substantially equidistant from the document language models corresponding to the sample relevant documents and the document language models corresponding to the sample non-relevant documents. Furthermore, the decision boundary may be determined at least in part by the positive feedback inputs and the negative feedback inputs received by the host computing element and/or the user interface. In some such embodiments, the host computing element may generate the decision boundary by applying a kernel based learning algorithm to the received positive feedback input and the received negative input wherein the learning algorithm may include, but is not limited to, a support vector machine. Then the host computing element uses the learned decision boundary to determine the relevance of each document. In some embodiments, the combination of the initial ranking and the relative position of each document language model corresponding to the decision are used to re-rank all the documents.

In some embodiments, the host computing element may apply statistical estimation methods to refine the query language model once the relevance feedback is available, wherein the statistical estimation methods may include, but are not limited to a Generative Mixture Model and Divergence Minimization Approach, such as that generally described in C. Zhai and J. Lafferty, "Model-based feedback in the language-modeling approach to information retrieval", In *Proceedings of the Tenth International Conference on Information and Knowledge Management*, pp. 403-410, 2001.

Some system embodiments further comprise a memory device configured to be capable of storing at least a portion of the plurality of documents and/or various document language models corresponding thereto. According to such embodiments, the memory device may be integrated with the host computing element and/or in communication therewith via a network or other link.

Other embodiments provide methods and computer program products for sorting a plurality of documents based at least in part on a relationship between each of the plurality of documents, a user query, and user relevance feedback. In one embodiment, the method comprises converting each of the plurality of documents into a corresponding document language model, wherein the document language model is associated with a distribution of a plurality document terms present in the plurality of documents and a distribution of a plurality document terms present in the plurality of documents. The method further comprises converting the user query into a corresponding query language model, wherein the query language model is associated with a distribution of a plurality of query terms present in the user query and a distribution of a plurality document terms present in the plurality of documents. The method and/or computer program product further comprises a step for mapping each of the document language model and the query language model in a vector space determined by a kernel function (referred to generally herein as the language modeling kernel). In one embodiment, the kernel function integrates the query language model with the symmetric KL divergence measure between two document language models. In other embodiments, the kernel function may integrate the query language model with other similarity/distance measures between two probability distributions. Then, the method and/or computer program product may rank each of the plurality of documents based at least in part on a similarity relationship between each of the plurality of document language models and the query language model in the vector space determined by the kernel function to determine a relative relevance of each of the plurality of documents to the user query. Some method and/or computer program embodiments may further comprise displaying the ranked plurality of documents to a user, wherein the documents having the smallest measured distance (corresponding, for example, to the documents most relevant to the user query) are displayed first.

According to some method and/or computer program embodiments, the step for converting each of the plurality of documents into a corresponding document language model further may further comprise analyzing the distribution of the plurality document terms present in the plurality of documents to determine a statistical measure of at least one of a prevalence of each of the plurality of document terms in each of the plurality of documents and a prevalence of each of the plurality of document terms in the plurality of documents. Furthermore, in some embodiments, the step for converting the user query into a corresponding query language model may further comprise analyzing the distribution of the plurality of query terms present in the user query relative to the distribution of the plurality of document terms present in the plurality of documents.

As described herein, the plurality of documents may comprise relevant documents and non-relevant documents relative to the user query. In such embodiments, the method and/or computer program product may further comprise steps for receiving and/or estimating a positive feedback input comprising a selection of at least one sample of the relevant documents and receiving and/or estimating a negative feedback input comprising a selection of at least one sample of the non-relevant documents. Some such embodiments may further comprise steps for refining the query language model from positive feedback, calculating a new language modeling kernel (such as a kernel function, for example) by replacing the query language model of the old kernel function with the refined query language model, mapping each document language model to a new high dimensional space determined by the language modeling kernel, and generating a decision boundary in the vector space between the document language models corresponding to the relevant sample documents and the document language models corresponding to the non-relevant sample documents such that the decision boundary is substantially equidistant from the document language models corresponding to the relevant documents and the document language models corresponding to the non-relevant documents. In such embodiments, refining the query language model may further comprise analyzing a distribution of the plurality document terms present in the plurality of sample relevant documents in the positive feedback input and a distribution of the plurality query terms in the plurality of sample relevant documents in the positive feedback input. In such embodiments, the decision boundary is determined at least in part by the positive feedback input and the negative feedback input. In some embodiments, generating the decision boundary may comprise applying a kernel based learning algorithm to the received positive feedback input and the received negative input, wherein the kernel based learning algorithm may include, but is not limited to, a support vector machine. Some such embodiments use the learned decision boundary to determine the relevance of each document. In some embodiments, the combination of the initial ranking and the relative position of each document language model corresponding to the decision are used to re-rank all the documents.

Thus the systems, methods, and computer program products for sorting a plurality of documents based initially on a relationship between each of the plurality of documents and a user query, then on the decision boundary generated by a double learning strategy plus the initial ranking as described in the embodiments of the present invention, provide many advantages that may include, but are not limited to: providing a system capable of systematically and dynamically representing documents as vectors, based at least in part on document statistics, collection statistics, and/or relevance statistics; providing dynamically-determined vector spaces based on the information needs specified by a particular user query and document language models corresponding to sample relevant documents; providing a systematic information retrieval system that is capable of adaptive learning via both positive and negative user feedback; providing a language modeling-based information retrieval system that is readily compatible with machine learning algorithms, such as the Support Vector Machine (SVM), and providing a systematic way to incorporate the advantages of both the vector space model (VSM) and the language modeling techniques.

BRIEF DESCRIPTION OF THE SEVERAL VIEWS OF THE DRAWINGS

Figure 1B:
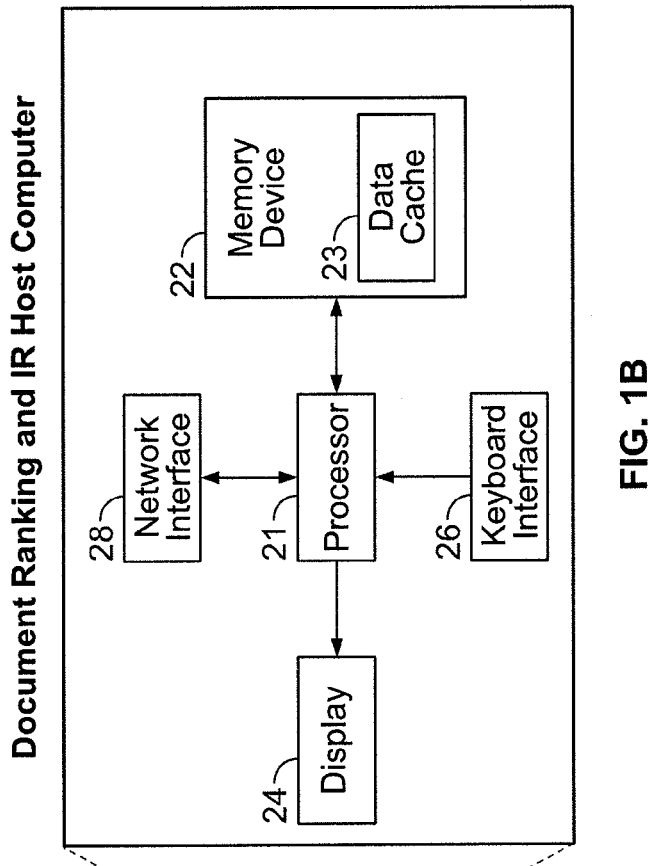
Figure 1A:
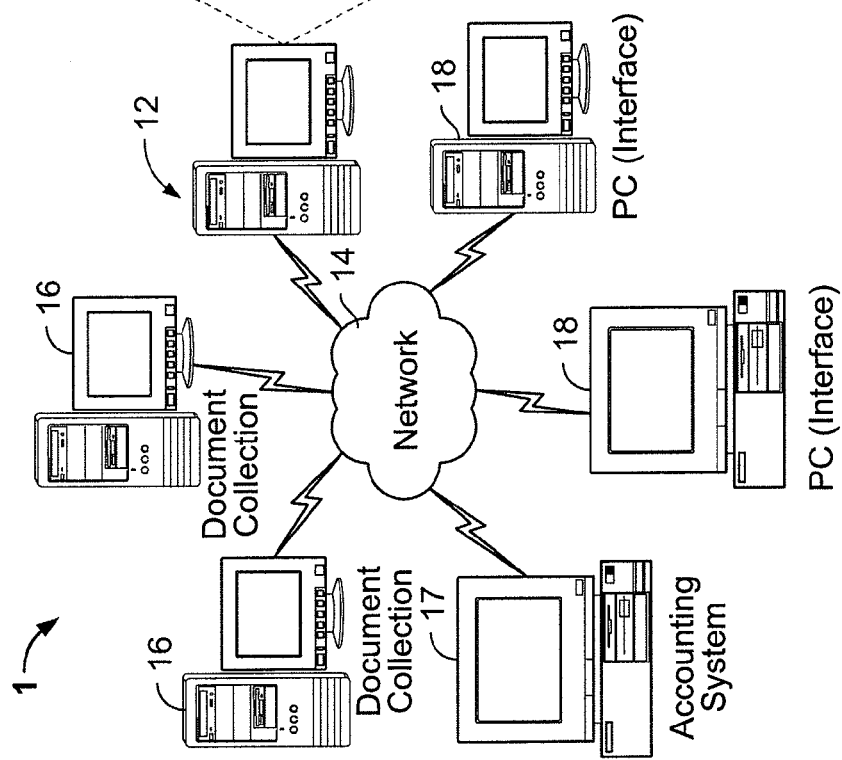
Figure 2:
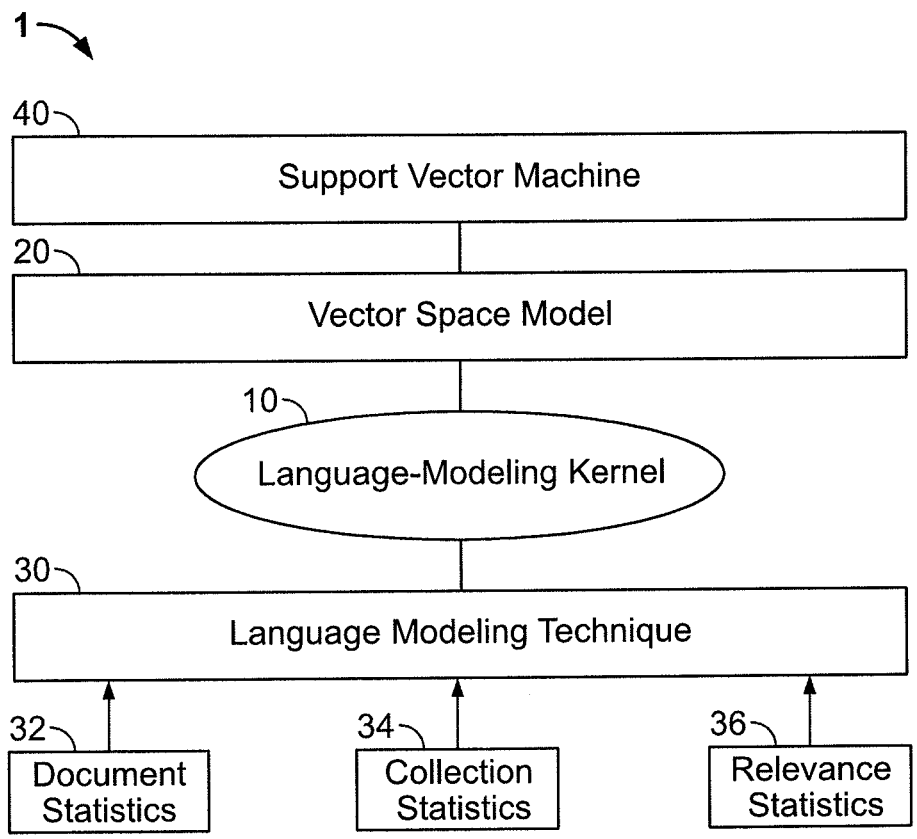
Figure 3:
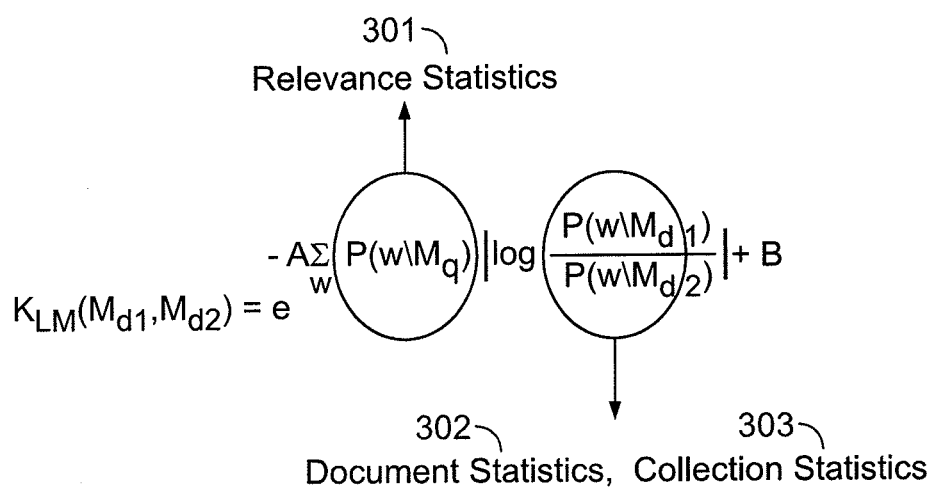
Figure 4:
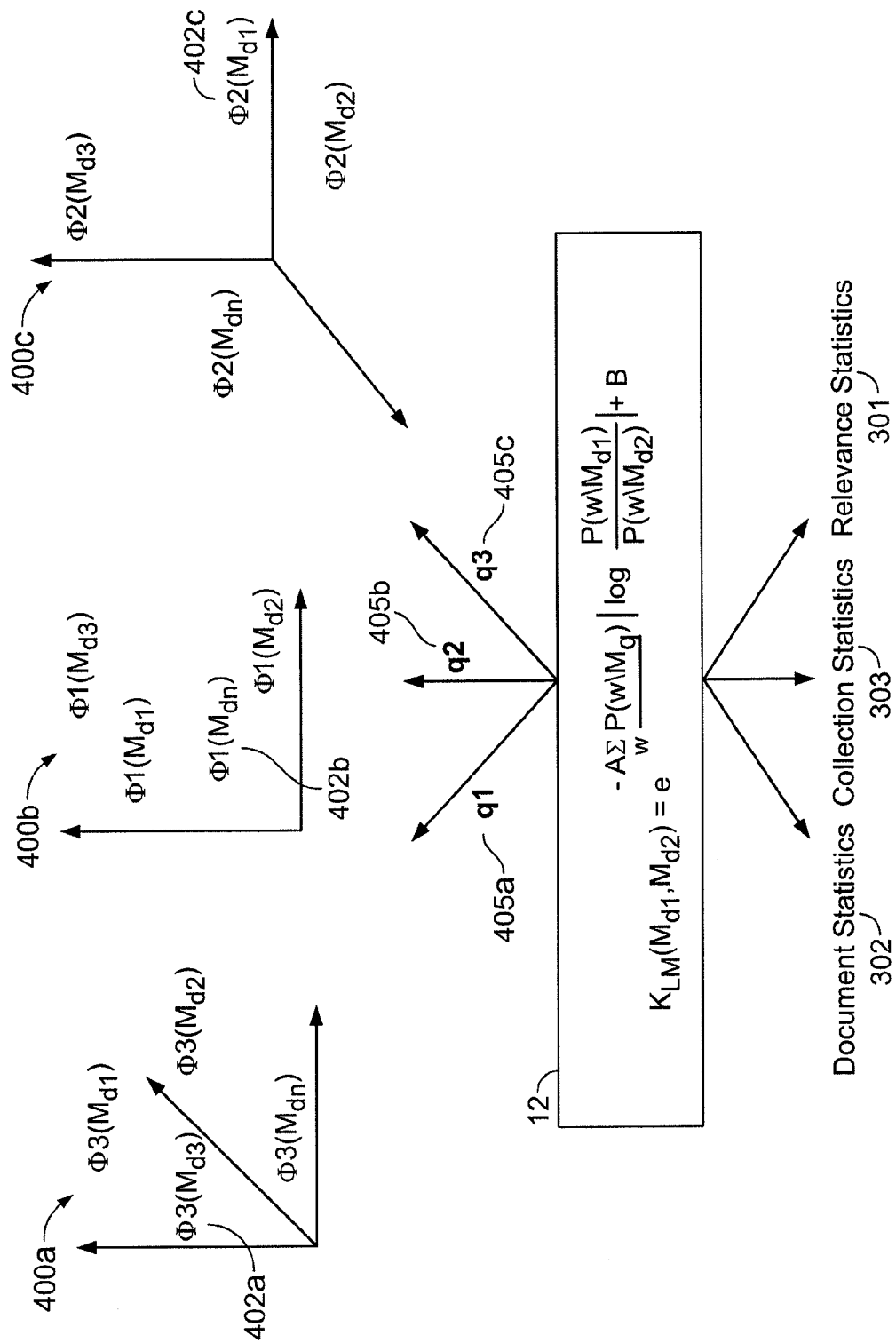
Figure 5:
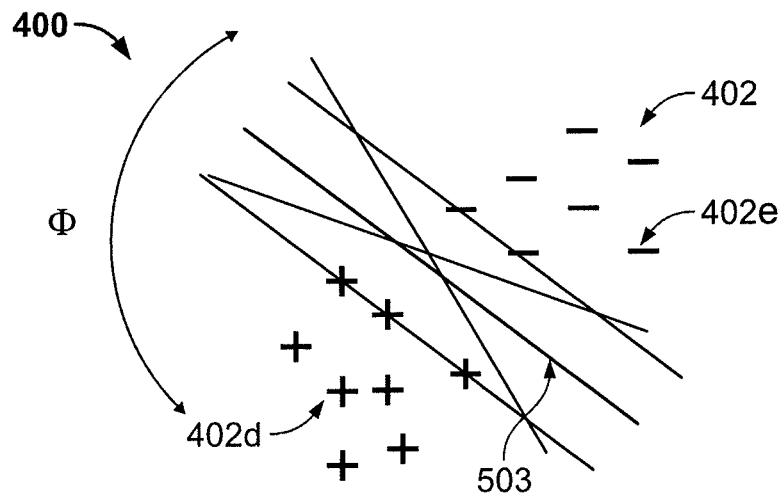
Figure 6:
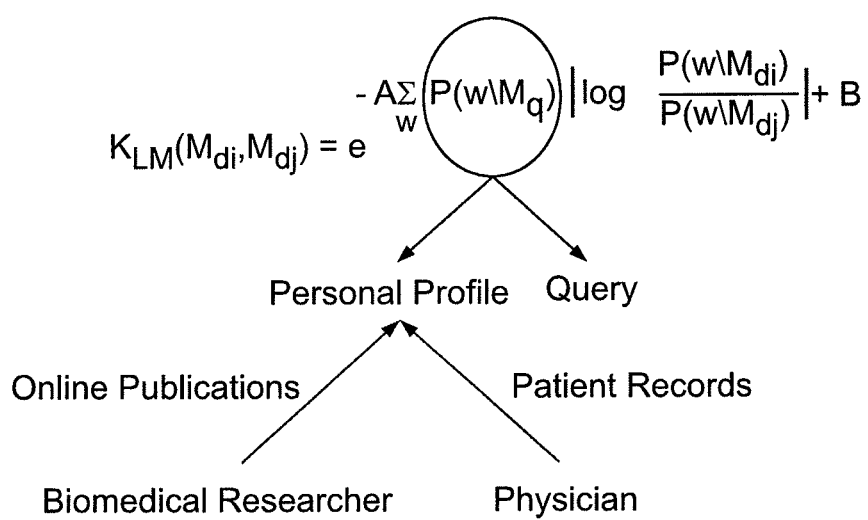
Figure 7:
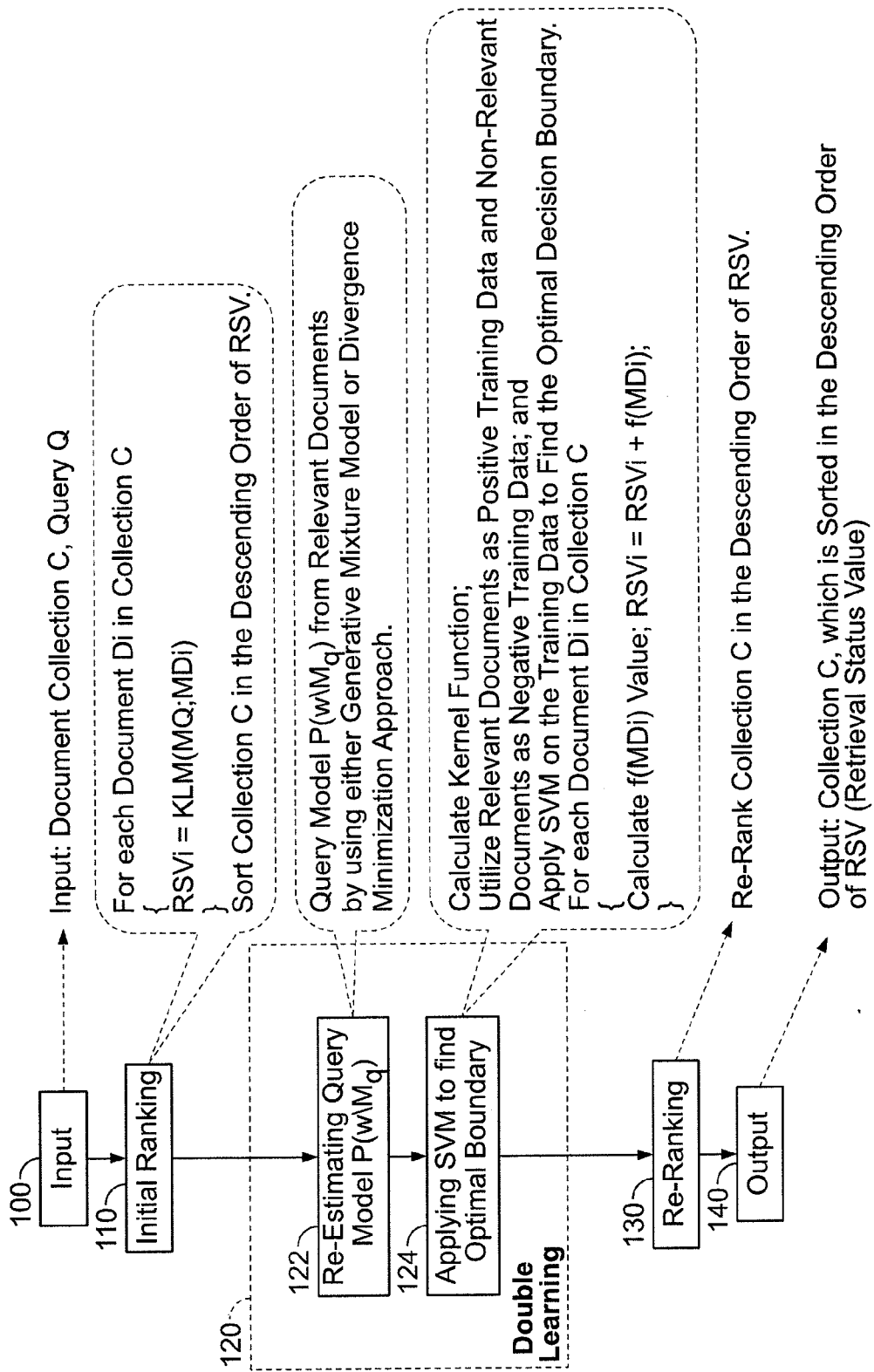
Figure 8:
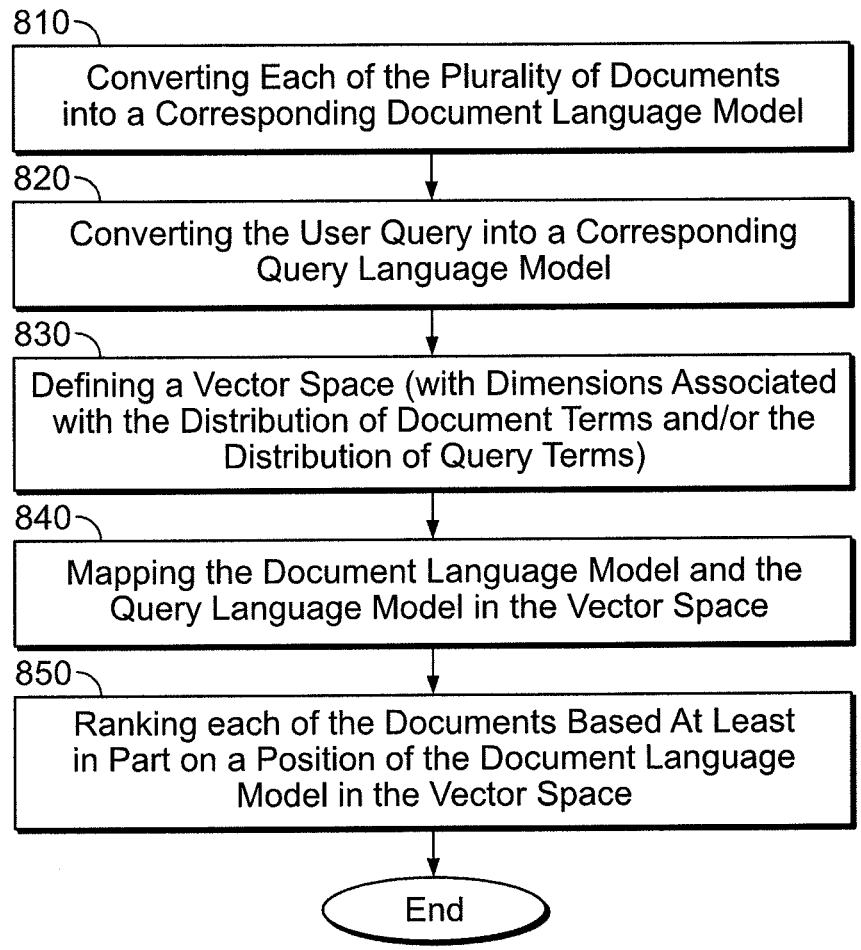
Figure 9:
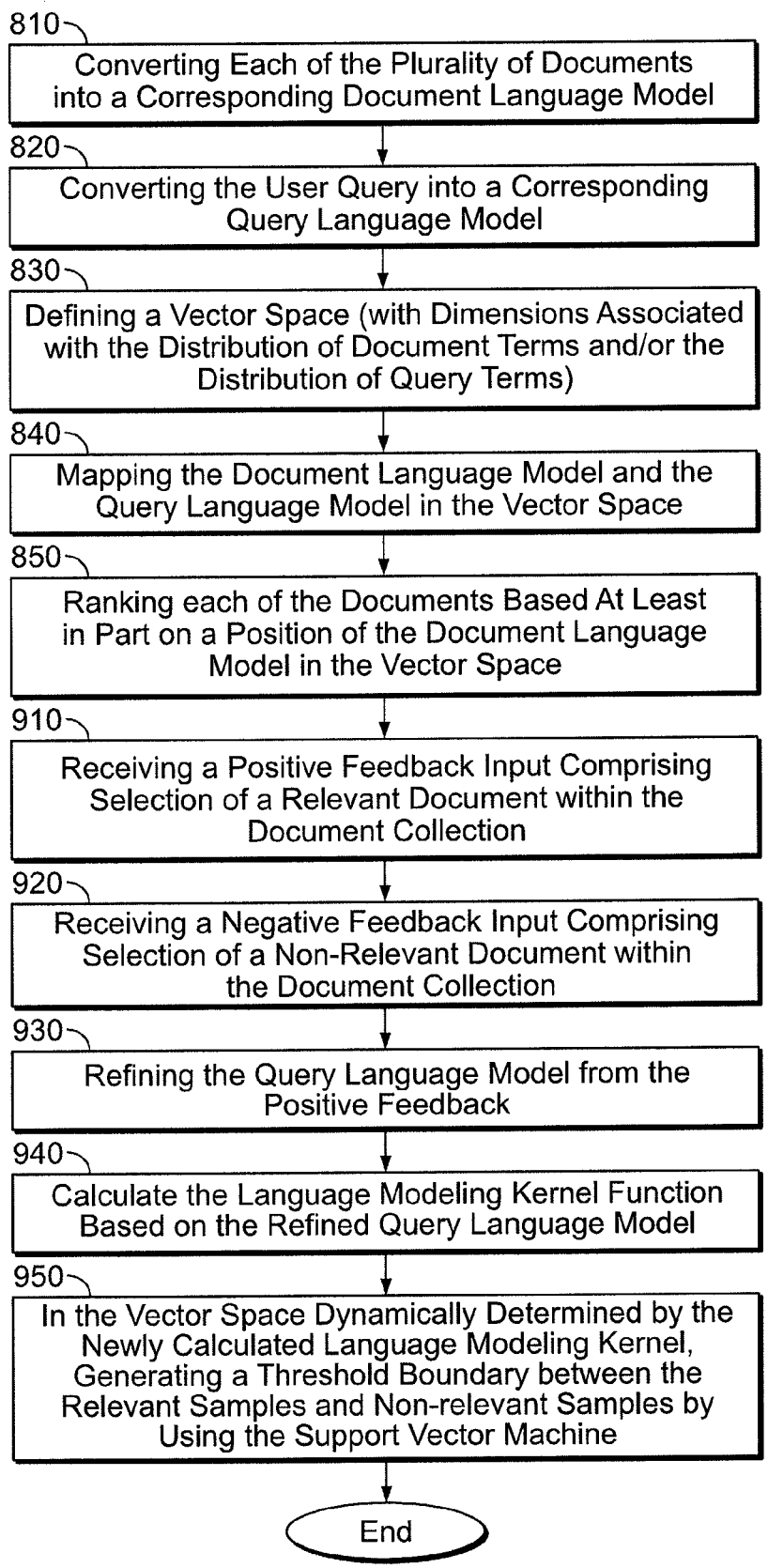
Figure 10:
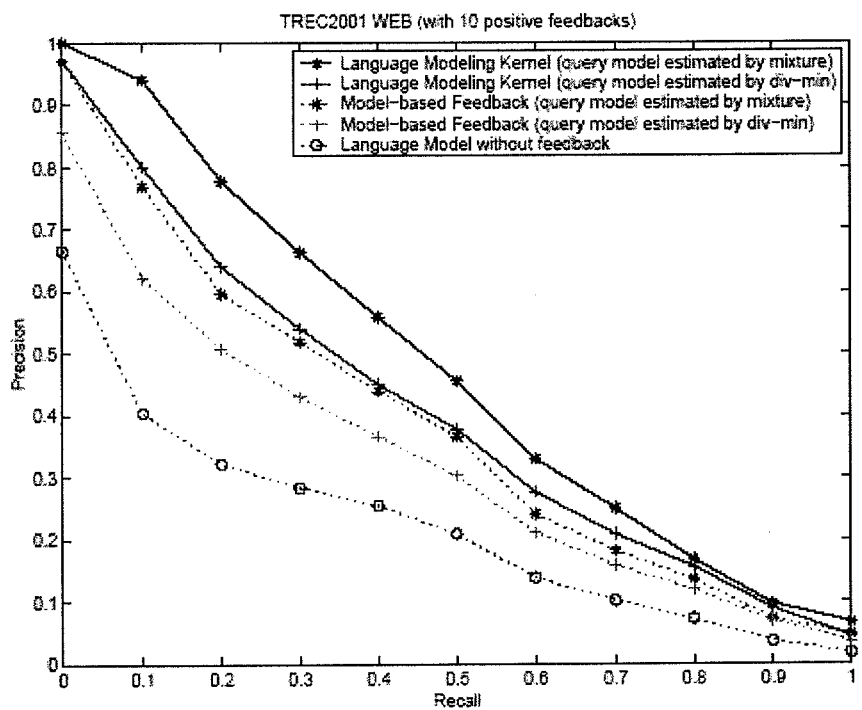
Figure 11:
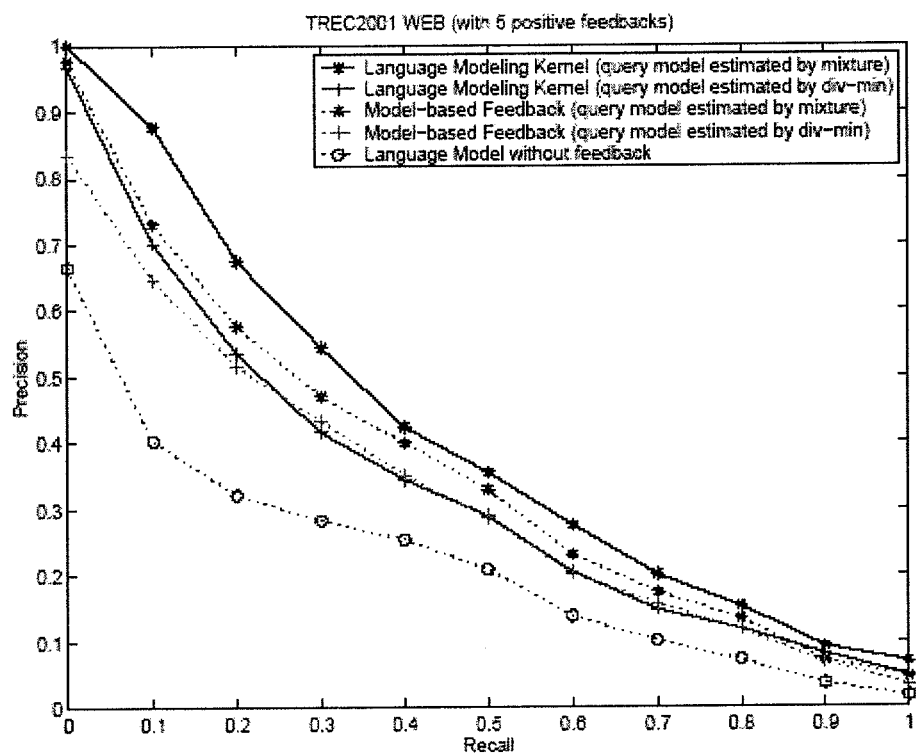
Figure 12:
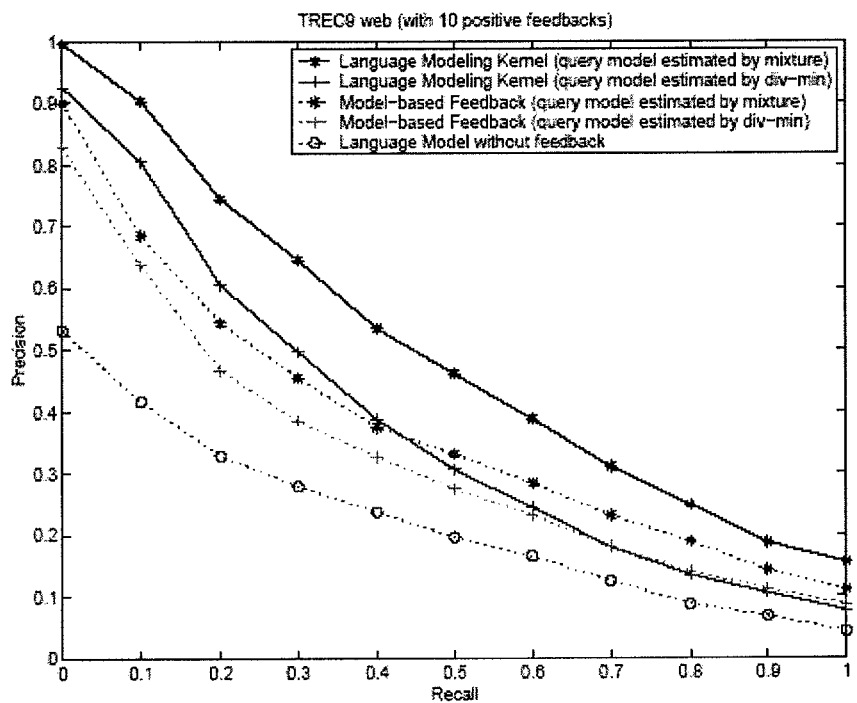
Figure 13:
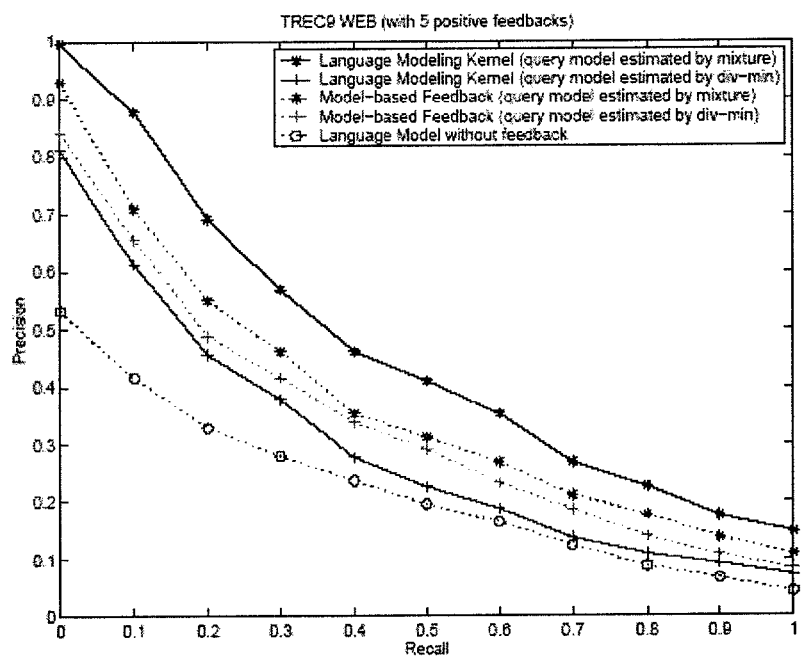
Figure 14:
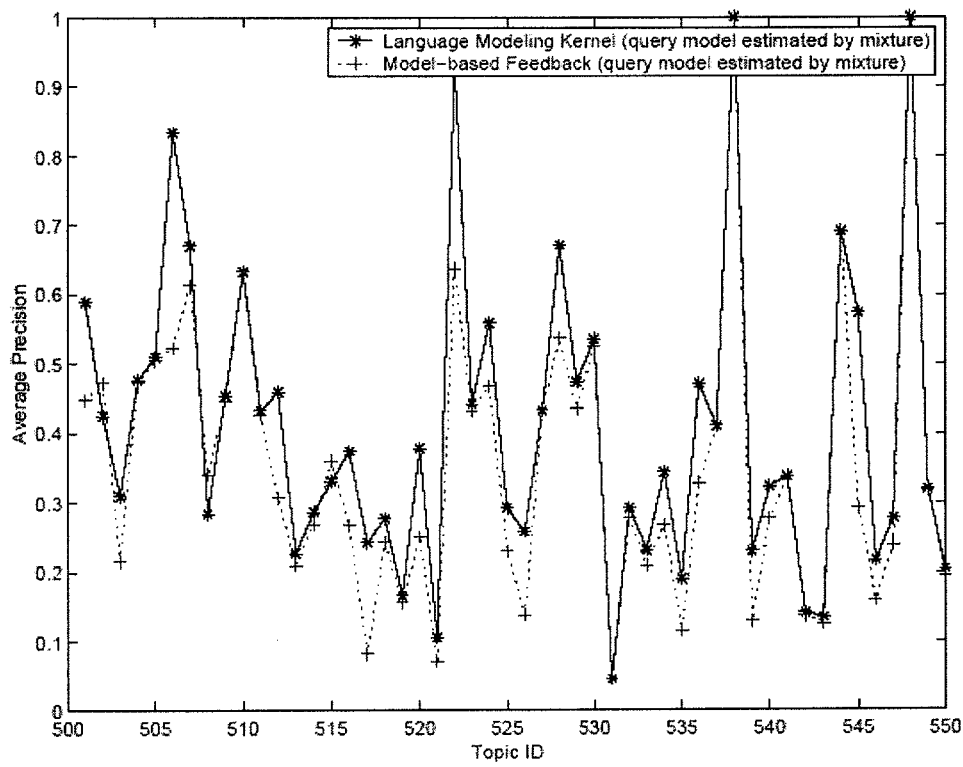
Figure 15:
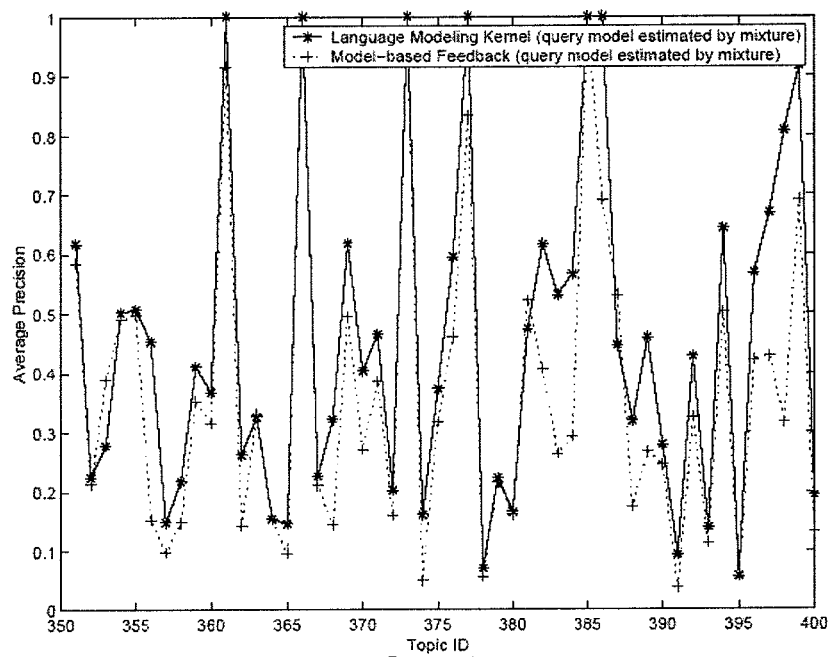
Figure 16:
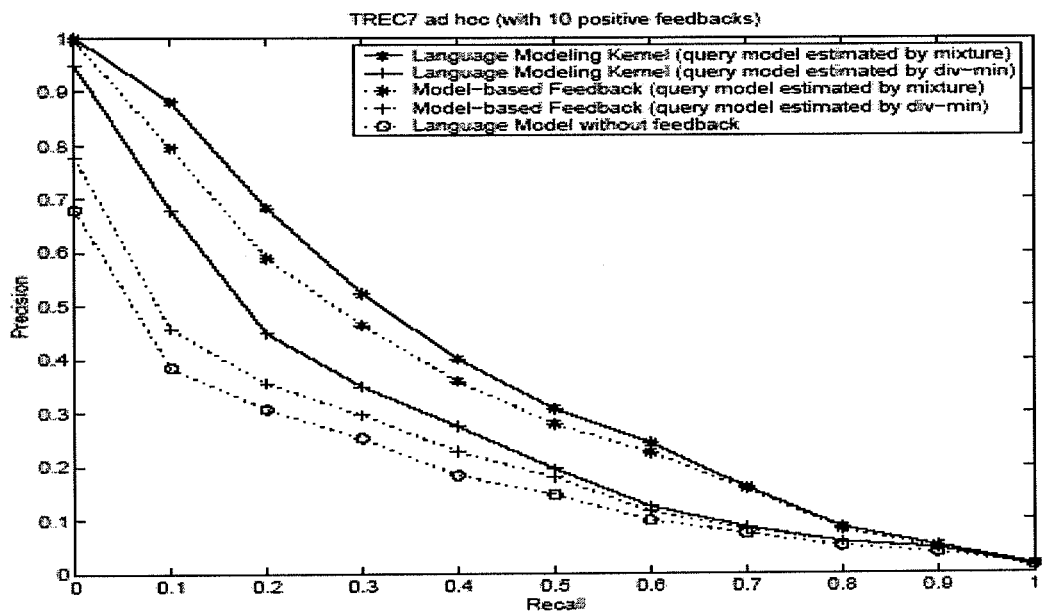
Figure 17:
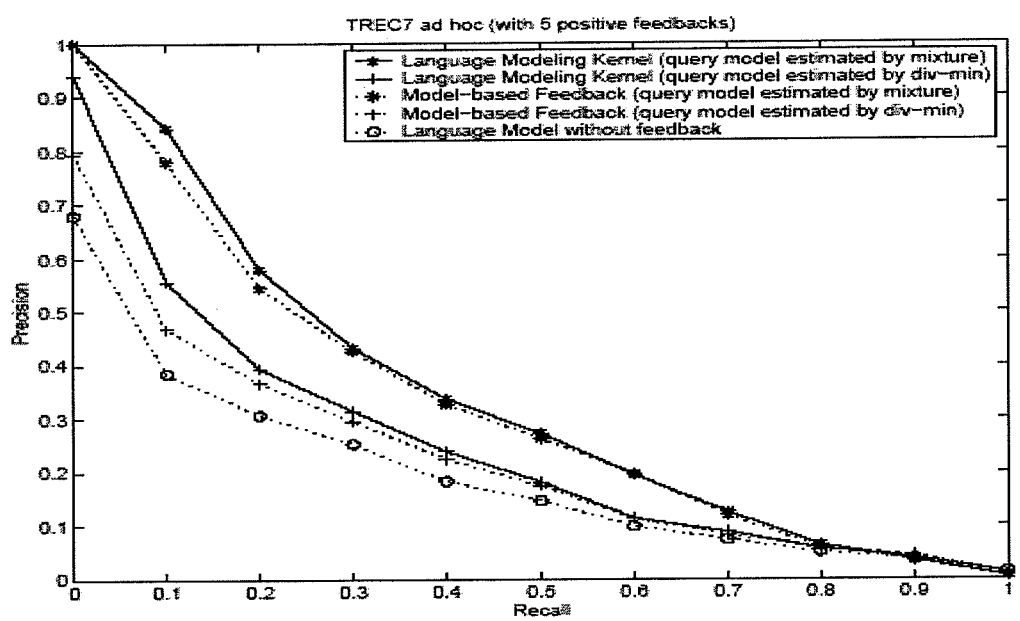
Figure 18:
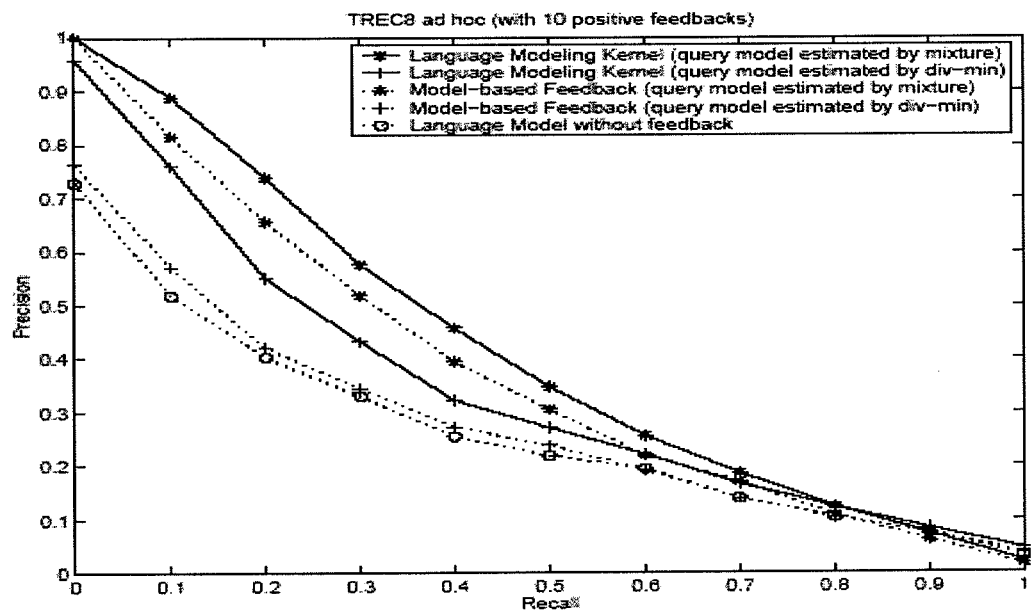
Figure 19:
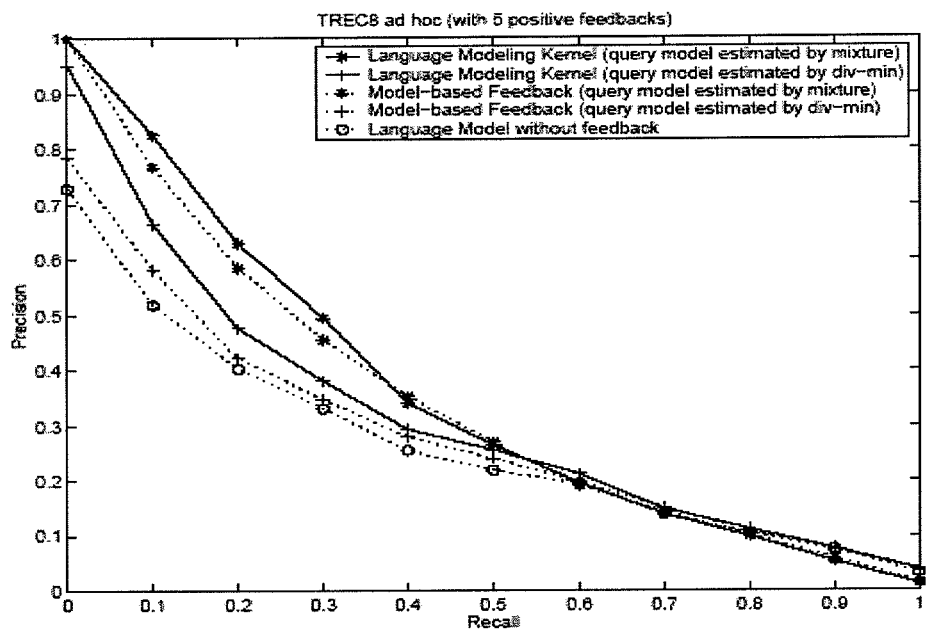
Figure 20:
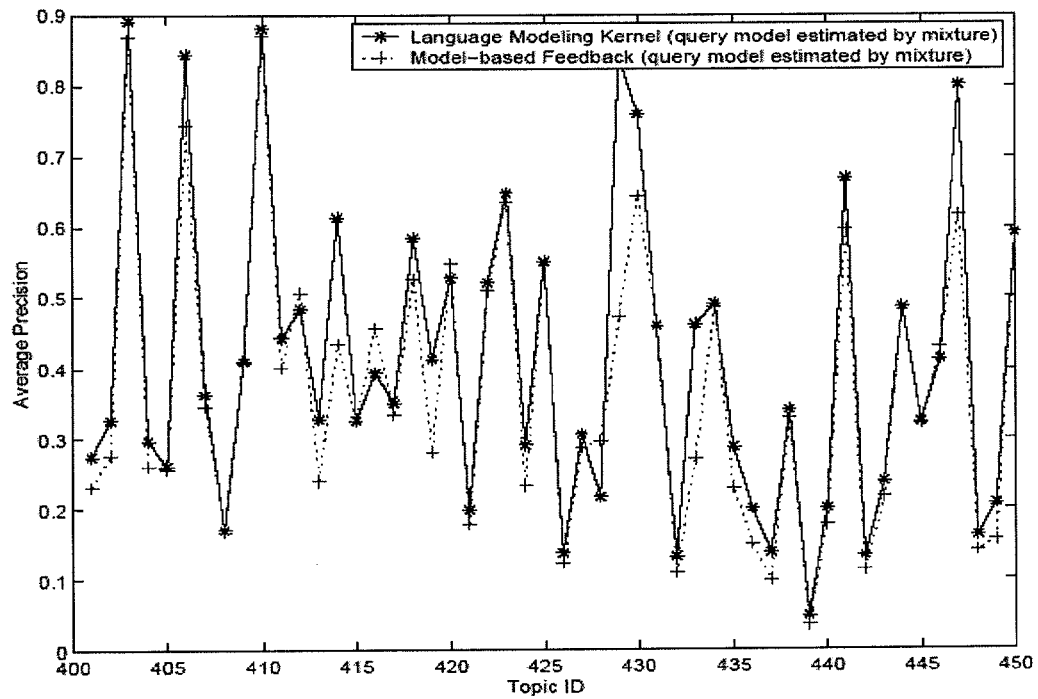
Figure 21:
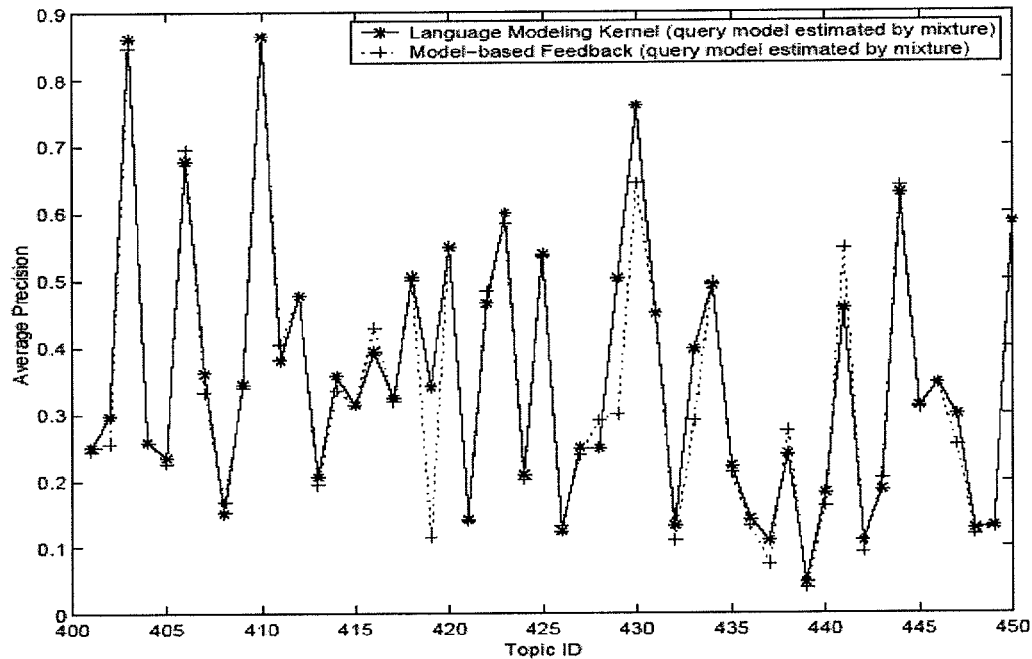
Figure 22:
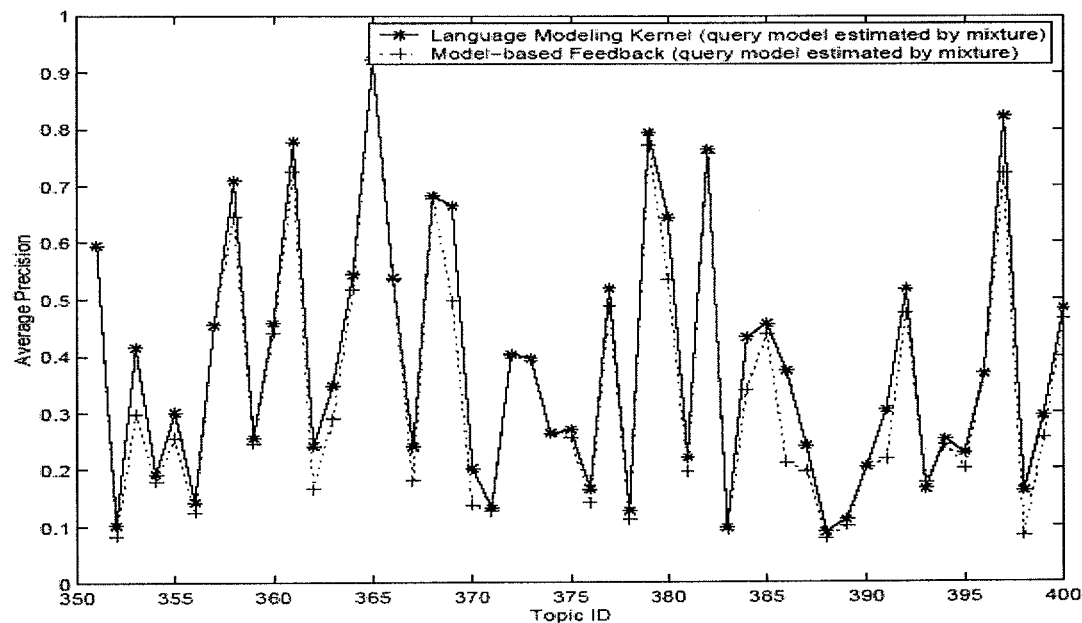
Figure 23:
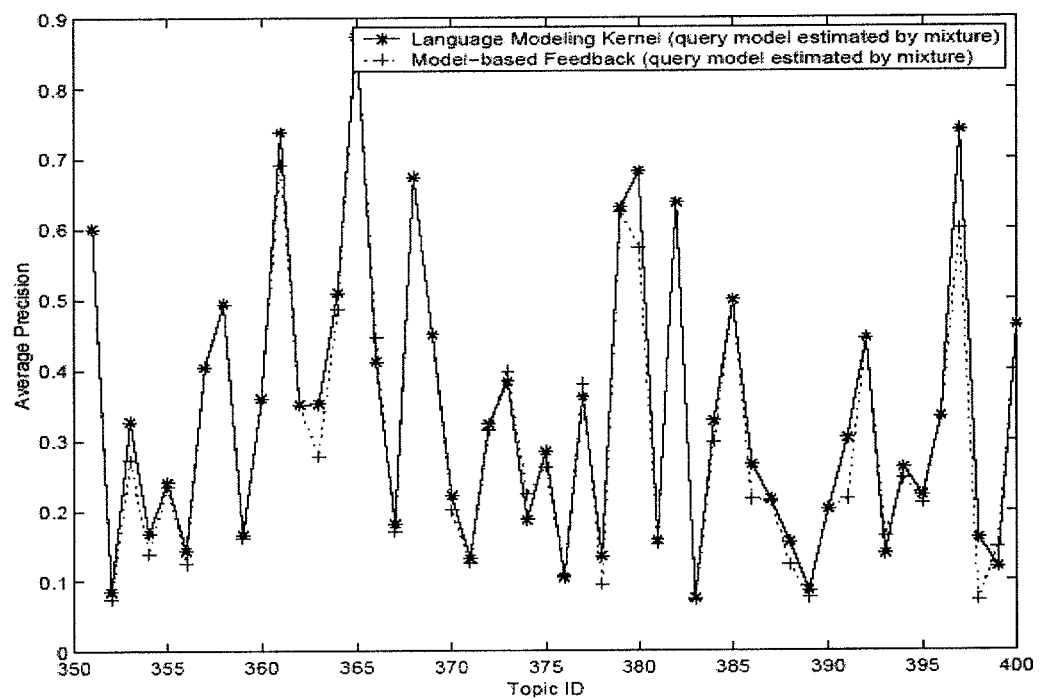

Having thus described the invention in general terms, reference will now be made to the accompanying drawings, which are not necessarily drawn to scale, and wherein:

FIGS. 1A and 1B illustrate a typical network environment in which the systems, methods, and computer program products may be implemented according to one embodiment of the present invention;

FIG. 2 is a non-limiting illustration of the system architecture of an IR system for ranking documents using a language modeling kernel, according to one embodiment of the present invention;

FIG. 3 is a non-limiting illustration of the roles played by the document language model $M_D$ and the query language model $M_Q$ in a language modeling kernel function, according to one embodiment of the present invention;

FIG. 4 is a non-limiting illustration of the operation of a language modeling kernel function, wherein the system embodiments utilize the kernel function to create vector space corresponding to specific user queries, according to one embodiment of the present invention;

FIG. 5 is a non-limiting graphical depiction of the operation of a machine learning algorithm in a vector space defined by a language modeling kernel function, according to one embodiment of the present invention;

FIG. 6 is a non-limiting graphical depiction of the use of a query language model $M_Q$ to incorporate supplemental information, such as personal profile information, in a specialized IR process using a language modeling kernel function, according to one embodiment of the present invention;

FIG. 7 is a non-limiting graphical depiction of method steps, according to one embodiment of the present invention, comprising initial document ranking using a language modeling kernel function, double learning via application of a machine learning algorithm, and re-ranking of documents;

FIG. 8 is a non-limiting graphical depiction of method steps for initial ranking, according to one embodiment of the present invention, comprising generating document and query language models, defining a vector space using a language modeling kernel function, mapping the document language models in vector space, and ranking the documents based on the document language model map;

FIG. 9 is a non-limiting graphical depiction of method steps for both initial ranking and double learning, according to one embodiment of the present invention, further comprising receiving positive and negative feedback comprising the selection of certain sample relevant and non-relevant documents, refining query language model from positive feedback, calculating a new language modeling kernel (kernel function) based on the refined query language model, mapping each document language model to a new high dimensional space determined by the language modeling kernel, generating a decision boundary in the vector space between relevant and non-relevant documents, and re-ranking all the documents based on the learned decision and initial ranking;

FIG. 10 is Results Plot 1.1 of the precision-recall curve on TREC2001 web collection with 10 positive feedbacks;

FIG. 11 is Results Plot 1.2 of the precision-recall curve on TREC2001 web collection with 5 positive feedbacks;

FIG. 12 is Results Plot 1.3: the precision-recall curve on TREC9 web collection with 10 positive feedbacks;

FIG. 13 is Results Plot 1.4: the precision-recall curve on TREC9 web collection with 5 positive feedbacks;

FIG. 14 is Results Plot 1.5 of performance analysis on individual queries with 5 positive feedbacks;

FIG. 15 is Results Plot 1.6 of performance analysis on each individual query (topic 451-500) with 5 positive feedbacks;

FIG. 16 is Results Plot 1.7: the precision-recall curve on TREC7 ad hoc task collection with 10 positive feedbacks;

FIG. 17 is Results Plot 1.8: the precision-recall curve on TREC7 ad hoc task collection with 5 positive feedbacks);

FIG. 18 is Results Plot 1.9: the precision-recall curve on TREC8 ad hoc task collection with 10 positive feedbacks;

FIG. 19 is Results Plot 1.10: the precision-recall curve on TREC8 ad hoc task collection with 5 positive feedbacks;

FIG. 20 is Results Plot 1.11: performance analysis on each individual query (topic 401-450) with 10 positive feedbacks;

FIG. 21 is Results Plot 1.12: performance analysis on each individual query (topic 401-450) with 5 positive feedbacks;

FIG. 22 is Results Plot 1.13: performance analysis on each individual query (topic 351-400) with 10 positive feedbacks; and FIG. 23 is Results Plot 1.14: performance analysis on each individual query (topic 351-400) with 5 positive feedbacks.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The various aspects of the present invention mentioned above, as well as many other aspects of the invention are described in greater detail below. The various system, method, and computer program product embodiments of the present invention are described herein with respect to the ranking, sorting, and retrieval of documents. It should be understood that the term "document," as used herein may refer to a number of different document entities stored in electronic formats that may include, but are not limited to: HTML files; XML files; images; electronic documents; word processor document files; PDF files and other file types that may be categorized by terms included therein (including terms present in title and/or identifying data strings that may be associated with the document). Furthermore, it should be understood that the term "language model," as used herein may refer to a probability distribution of terms within a particular document (i.e., a "document language model") and/or a probability distribution of terms within a particular user query (i.e., a "query language model"). The mathematical definition of the term "language model" is defined further herein with reference to the various equations used to define the language-modeling kernel function. It should also be understood that the term "kernel function" as used herein, refers generally to the central component of a computer operating system (such as that run, for example, by the host computing element 12 described herein). Particularly, the "kernel function" of the language-modeling kernel function described herein is described mathematically with respect to the Equations (5) and (7) presented herein.

As described herein, the various systems 1, methods, and computer program product embodiments of the present invention provide an integrated information retrieval (IR) framework where documents can be systematically and dynamically represented as vectors based on the document statistics 302, collection statistics 303 and relevance statistics 301 (see FIG. 3, for example and Equation (5)), which are captured by utilizing the language modeling technique. The architecture of this integrated framework for information retrieval is shown in FIG. 2. One key component of the system 1 embodiments of the present invention is a kernel function (see Equation (5)) referred to generally herein as the "language modeling kernel" or the "kernel function".

As described further herein, the language modeling kernel of Equation (5) measures the similarity relationship between a pair of document language models, and maps each document language model to a high dimensional space. According to some embodiments, the host computing element 12 (see FIGS. 1A and 1B, for example) is configured to be capable of executing a process comprising the execution of the language modeling kernel function wherein the host computing element 12 automatically maps document language models into a vector space (see, for example, the various vector spaces 400a, 400b, 400c corresponding to user information needs 405a, 405b, 405c, as shown generally in FIG. 4).

As one skilled in the art will appreciate, Mercer's theory presupposes that every (semi) positive, definite and symmetric function is a "kernel." See generally, James Mercer, *Functions of positive and negative type and their connection with the theory of integral equations.*, Philos. Trans. Roy. Soc. London, 1909. Such kernels determine a map φ, which maps the data from the input space to a vector space. The inner product in the mapped vector space corresponds to the kernel function in the original space. In formula, this relationship may be expressed generally as:

$$K(x_1, x_2) = \langle \phi(x_1), \phi(x_2) \rangle \quad (1)$$

According to Mercer's theory, if a kernel function may be defined on document language models, then the kernel function may be capable of automatically mapping the document language models to a vector space (see 400a, 400b, 400c, for example, in FIG. 4). Furthermore, if the kernel function is defined using document language models that take advantage of document statistics 302, collection statistics 303 and relevance statistics 301 (see FIG. 4, for example), the resulting procedure yields a systematic way to represent documents (such as documents provided by one or more data sources 16) as vectors (see elements 402a, 402b, 402c) that may be evaluated using machine learning algorithms (such as the SVM, for example).

Mercer's theory further indicates that the inner dot product in a mapped vector space equates to a kernel function in an original (query) space. The inner dot product essentially evaluates a similarity relationship between two vectors. Therefore, the kernel function should also reflect a similarity relationship between the data in the original input space. Hence, finding a proper measure to evaluate similarity relationship between two probability distributions is one way to define a proper kernel function for document models. However, a key aspect of the design of the system 1 described herein is that the similarity relationship between documents must vary along with the changes of user information needs (as embodied, for example, in user information needs 405a, 405b, 405c).

Thus, the design of the kernel function of Equation (5) begins with the evaluation of existing similarity or distance measures for probability distributions (such as, for example, the distribution of the plurality of document terms within the various documents of a document collection). The Kullback-Leibler divergence (also referred to generally as "KL-divergence") is often utilized to evaluate the divergence between two probability distributions. Thus, given two document models $M_{D1}$ and $M_{D2}$, the KL-divergence between $M_{D1}$ and $M_{D2}$ may be defined as:

$$D(M_{D1} \| M_{D2}) = \sum_w P(w|M_{D1}) \log \frac{P(w|M_{D1})}{P(w|M_{D2})} \quad (2)$$

However, as one skilled in the art will appreciate, KL-divergence is not necessarily symmetric and may not satisfy the triangle inequality. Therefore, the KL-divergence defined by Equation (2) may not be directly applied to evaluate the distance between two document models in the query space. In order to overcome this problem, a substantially symmetric variant of KL-divergence may be used, for example:

$$D(M_{D1}, M_{D2}) = \quad (3)$$
$$\sum_w P(w|M_{D1}) \log \frac{P(w|M_{D1})}{P(w|M_{D2})} + \sum_w P(w|M_{D2}) \log \frac{P(w|M_{D2})}{P(w|M_{D1})}$$

However, even a substantially symmetric KL-divergence (as defined, for example, by Equation (3)) still yields a substantially absolute measure, whose result may not be capable of variation along with the change of a user information needs (as embodied in user information needs 405a, 405b, 405c, for example). In order to incorporate the user information needs 405a, 405b, 405c into consideration when designing the distance measure for document language models, a query language model is provided to model the user information need. As described in the presentation of J. Lafferty and C. Zhai, entitled, *Document Language Models, Query Models, and Risk Minimization for Information Retrieval* at the 2001 ACM SIGIR Conference on Research and Development in Information Retrieval ((SIGIR '01)), 2001), the contents of which are incorporated by reference herein in their entirety, a user particular information need may be modeled as a query language model ($P(w|M_Q)$, as shown in Equation (4), for example), from which a user query may be randomly generated. Based on this assumption, a new distance measure for document models may be defined generally as:

$$D(M_{D1}, M_{D2}) = \sum_w P(w|M_Q) \log \left| \frac{P(w|M_{D1})}{P(w|M_{D2})} \right| \quad (4)$$

The distance measure of Equation (4) is biased by the query language model that reflects the user particular information need. Accordingly, the kernel function (also referred to herein as the "language modeling kernel") of Equation (5) was developed to solve this problem:

$$K_{LM}(M_{D1}, M_{D2}) = e^{-A \sum_w P(w|M_Q) \log \left| \frac{P(w|M_{D1})}{P(w|M_{D2})} \right| + B} \quad (5)$$

where parameters A and B are scale and shift factors, respectively. When B=0, it should be understood that $0 < K_{LM}(M_{D1}, M_{D2}) \leq 1$, and $K_{LM}(M_{D1}, M_{D2}) = 1$ if and only if $M_{D1} = M_{D2}$. According to Mercer's theory, this positive definite and symmetric function is a kernel. As described herein, the kernel function of Equation (5) constitutes one embodiment of a "language modeling kernel" that may be run, for example, by the host computing element 12 of the various system 1 embodiments of the present invention.

As shown generally in FIG. 3, the language modeling kernel defined, for example, by Equation (5) incorporates both document language model components (see $M_D$ for example, incorporating both document statistics 302 and collection statistics 303) and user query language models (see $M_Q$ for example, incorporating relevance statistics 301). A simplified maximum likelihood estimator (MLE) may be used to estimate the document language model components ($M_D$). Even the simplest MLE takes advantage of the document statistics (term frequency) information. More complex estimators, such as Markov chain expansions, as described in the presentation of J. Lafferty and C. Zhai, entitled, *Document Language Models, Query Models, and Risk Minimization for Information Retrieval* at the 2001 ACM SIGIR Conference on Research and Development in Information Retrieval, may be utilized to take advantage not only of the document statistics 302, but also the collection statistics 303 (i.e., term-term co-occurrence within a document collection housed by a particular data source 16). Relevance statistics 301 can be incorporated to estimate the query language model component ($M_Q$ for example). Therefore, the language-modeling kernel (shown, for example, in Equation (5), and in FIG. 3) maintains the advantages provided by the language modeling technique while allowing for the mapping of documents in the vector space 400a, 400b, 400c (see FIG. 4, for example).

More particularly, as shown in FIG. 4, the language modeling kernel enables the host computing element 12 to dynamically map document language models 402a, 402b, 402c to different vector spaces 400a, 400b, 400c according to different information needs embodied in various user queries 405a, 405b, 405c. The query language model component ($M_q$ for example) is used to model the user information need as a query language model, for example. Thus, different information needs (as embodied in various users' information needs 405a, 405b, 405c) determine different language modeling kernels. Furthermore, different language modeling kernels determine different vector spaces 400a, 400b, 400c. This process is illustrated schematically in FIG. 4 relative to the components of the kernel function shown, for example, as Equation (5).

The language-modeling kernel of Equation (5) has the ability to integrate at least three types of information: (1) term frequency, (2) term-term co-occurrence, and (3) relevance statistics, into a unified framework. Therefore, the vector space determined by the language-modeling kernel is also able to incorporate these three types of information. In summary, the language-modeling kernel provides a systematic way to build an optimal vector space 400a, 400b, 400c for information retrieval by taking advantage of the modeling power provided by language modeling techniques. By Mercer's theory, the Eigen functions of the language-modeling kernel act as the features of the mapped vector space 400a, 400b, 400c. Thus, in some system 1 embodiments of the present invention, the host computing element 12 may receive the relevance feedback after the initial ranking is presented to the user, refine the query language model from the positive sample (in other words, the re-estimation of the query language model $M_Q = P(w|M_Q)$ utilizes relevance statistics 301), and calculate the new language modeling kernel (shown in Equation (5), for example) 12, which comprises both the refined query language model component and the document language model component. The estimation of the document language model utilizes the document statistics 302 and the collection statistics 303. Hence, the dynamically determined language-modeling kernel calculated at the host computing element 12 (of FIG. 1) utilizes document statistics, collection statistics, and relevance statistics. The language-modeling kernel automatically maps document language models to a different vector space (for example, 400a, 400b, and 400c) corresponding to different user information needs (405a, 405b, and 405c). In the vector space 400, a decision boundary 503 can be learned by applying a machine learning algorithm (such as SVM, for example) on the positive sample documents 402d and the negative sample documents 402e. The learned decision boundary (shown in Equation (6), for example) combined with the initial ranking can then be used to re-rank all the documents 124 (see FIG. 7).

Hence, unlike conventional vector space modeling approaches, which build a vector space in heuristic ways, the language-modeling based feedback approach can systematically and dynamically determine a vector space by utilizing document statistics, collection statistics, and relevance statistics. In addition, unlike conventional model-based feedback approaches, which are only able to use positive feedback, the language-modeling kernel-based approach can utilize both the positive and negative feedbacks, and can integrate the advantages of machine learning algorithms, such as the SVM. The decision boundary 503 that SVM generates based on the training data in the mapped vector space 400 may be generally expressed as:

$$f(M_D) = \sum_i a_i y_i K_{LM}(M_{Di}, M_D) + b \qquad (6)$$

where $D_i$ is one of the feedback documents. If $D_i$ is relevant, $y_i = 1$, otherwise $y_i = -1$. By this decision boundary 503, a document D will be judged as relevant if $f(M_D) > 0$, and irrelevant if $f(M_D) < 0$. The kernel component of this decision boundary is substantially equal to the inner product in the mapped vector space 400. Therefore, even if the mapped vector space 400 is not easily visualized (as is common in complex high-dimensional vector spaces defined by some multi-term user queries), various machine learning algorithms (such as the SVM, for example) may be systematically applied to the mapped vector space based on the kernel function of Equation (5).

In some embodiments, the host computing element 12 may be configured to receive the relevance feedback though a user interface (see, for example, element 16) wherein the user explicitly specify samples of relevant documents and samples of non-relevant documents from the initial ranking. In other embodiments, the host computing element 12 may be configured to receive relevance feedback by monitoring user browsing (or reading, printing, etc.) behaviors as detected by the host computing element via the user interface 16, for example.

Thus according to various embodiments of the present invention, the whole retrieval process comprises: (1), initial ranking (see step 110 of FIG. 7); (2), a double learning stage (see step 120 of FIG. 7); and (3), a re-ranking stage (see step 130 of FIG. 7).

Thus according to various embodiments of the present invention, the initial ranking step (element 110, see FIG. 7) comprises estimating the query language model and each of the document language models. In some embodiments, the document language models can be estimated, indexed, and stored offline (such as in a memory device 22 or a data cache 23 thereof) in advance. Then, the language modeling kernel (Equation (5), for example) maps both the query language model and each of the document language models to a vector space, wherein the similarity value of each document language model to the query language model can be used as the retrieval status value ($RSV_i$ or $iRSV$) of the corresponding document. The equation for calculating the initial $RSV_i$ for document $D_i$ is as follows:

$$K_{LM}(M_Q, M_{D1}) = e^{-A \sum_w P(w|M_Q) \log \left| \frac{P(w|M_Q)}{P(w|M_{D2})} \right|} + B \qquad (7)$$

According to various embodiments of the present invention, different techniques may be used to estimate a query model $P(w|MQ)$ and a document model $P(w|M_{Di})$ for the initial ranking step (see step 110, FIG. 7, for example) For example, in one embodiment, the query model $P(w|MQ)$ and document model $P(w|M_{Di})$ are generated from query Q and document $D_i$ using a maximum likelihood estimator (MLE). Since query strings are almost always much shorter than document, $w \in Q$. Therefore, the ranking function of Equation (7) may be reduced to:

$$K_{LM}(M_Q, M_{Di}) = \sum_{w \in Q} P(w|M_{Di}) \qquad (8)$$

which is a ranking function used by many conventional language-modeling approaches for information retrieval.

In another embodiment, a query model P(w|MQ) and a document model P(w|$M_{Di}$) may be generated by taking term-term co-occurrence information into consideration in the initial ranking function (Equation (7), for example). For example, a Markov chain (derived from the inverted file of a document corpus) may be used to estimate both the query language model and document language model. This process is described generally in C. Zhai and J. Lafferty, "Model-based feedback in the language-modeling approach to information retrieval," in *Proceedings of the Tenth International Conference on Information and Knowledge Management*, pages 403-410 (2001) which is hereby incorporated by reference herein in its entirety. According to such embodiments, keeping only the terms that satisfy P(w|$M_Q$)>decision, and assume P(w|$M_Q$)>P(w|$M_{Di}$) holds for those terms, then the ranking function (Equation (7), for example), may reduce to:

$$K_{LM}(M_Q, M_{Di}) = \sum_w P(w \mid M_Q) \log P(w \mid M_{Di}) \qquad (9)$$

which constitutes a usable ranking function.

Thus according to various embodiments of the present invention, the learning stage (element 120, see FIG. 7) comprises: refining a query language model for the language-modeling kernel (Equation (5), for example) based on relevant documents. The refined (and/or newly calculated) language-modeling kernel then determines a revised vector space. Then, in the new vector space, the learning stage further comprises applying a language-model kernel-based machine learning algorithm (such as SVM, for example) over the feedback documents to find the optimal decision boundary (see element 503, FIG. 5); and finally, using the decision boundary 503 combined with the initial ranking (step 110, for example) to re-rank the documents (see generally, step 124, FIG. 7). Since relevant documents match the user information need (as embodied in one or more user queries), it is a natural way to refine the query language model based on the relevant documents. The techniques for refining the query language model may include, but are not limited to, the Generative Mixture Model and Divergence Minimization Approach as described by C. Zhai and J. Lafferty in "Model-based feedback in the language-modeling approach to information retrieval," pages 403-410.

According to one embodiment of the present invention, the re-ranking step (see element 130 of FIG. 7, for example) is accomplished by applying the learned decision boundary on all the documents to re-rank them. In some embodiments, the new RSVi can be calculated as follows:

$$RSV_i = RSV_i + f(M_{Di}) \qquad (10)$$

where f(MDi) is the value calculated when applying the boundary function to document Di.

In summary, FIG. 7 presents a flow diagram of a complete language-modeling kernel-based approach for information retrieval, according to one embodiment of the present invention. As described herein, this approach may be accomplished by a specialized IR system 1 (see FIGS. 1A and 1B, for example). Furthermore, FIG. 7 illustrates generally the steps and/or sets of computer instructions used to implement one embodiment of a method and/or computer program product of the present invention.

FIGS. 1A and 1B show a system 1, according to one embodiment of the present invention, for sorting a plurality of documents (retrieved from one or more data sources 16, such as Internet-based document collections, for example) by applying the language-modeling kernel based approach. As described herein, the host computing element 12 may be configured to run one or more functions, such as applying the language-modeling kernel based SVM to learn the decision boundary, and/or rank the plurality of documents.

It should be understood that the system 1 of the present invention may be adapted to interface with an existing search engine (such as one of many existing commercial Internet search engines, for example) for sorting a plurality of documents retrieved and ranked by the search engine based at least in part on a relationship between each of the plurality of documents and a user query received via the search engine. According to such system 1 embodiments, the host computing element 12 may be configured to receive a user relevance feedback via the search engine, wherein the user relevance feedback may comprise a selection of at least a portion of the retrieved plurality of documents. The selection may comprise a plurality of relevant document samples. As described further herein, the host computing element 12 may estimate a query language model based at least in part of the selected relevant document samples. Furthermore, the host computing element 12 may compute a language-modeling kernel (i.e., calculate $K_{LM}$, as shown in Equation (7)) based at least in part on the query language model. Furthermore the host computing element 12 may generate a plurality of document language models corresponding to each of the plurality of documents, wherein the document language models correspond at least in part to a plurality of terms present in each of the retrieved plurality of documents. Furthermore, the host computing element 12 may map the document language models to a vector space determined at least in part by the computed language-modeling kernel. As shown generally in FIG. 5, the host computing element 12 may further generate a decision boundary 503 in the vector space 400 between the document language models corresponding to the selected relevant document samples 402*d* and the document language models corresponding to a plurality of non-relevant documents 402*e*. Finally, the host computing element 12 may re-rank the plurality of documents retrieved from the search engine based at least in part on a location of the decision boundary 503 in the vector space 400 to refine the rank of the retrieved plurality of documents based at least in part on the query language model and the plurality of document language models. Thus, the various system 1, method, and computer program products of the present invention may be used in conjunction with existing search engines or IR mechanisms to refine and/or improve the precision and/or recall of the search engine as illustrated generally in the "Experimental" section included herein.

As shown generally in FIG. 1A, the system 1 may comprise one or more data sources 16 comprising the plurality of documents. The system 1 further comprises a host computing element 12 in communication with one or more of the data sources 16 and configured to receive an initial user input comprising the user query. As shown in FIG. 1A the host computing element 12 may be in communication with one or more data sources 16 and/or with one or more user interfaces 18 via a network 14 which may include, but is not limited to the Internet, LAN, WAN, and/or other wire-based and wireless networks.

As shown generally in the system 1 architecture schematic of FIG. 2, the host computing element 12 may be configured to be capable of and/or configured for converting each of the plurality of documents into a corresponding document language model (see, for example $M_D$ in Equation (5)), wherein the document language model ($M_D$) may be associated with a distribution of a plurality document terms present in the plurality of documents. As shown in FIG. 2, the host computer 12 may utilize a language modeling technique (as described herein with reference to Equation (5)) that utilizes a distribution of a plurality of document terms present in the plurality of documents to convert each of the plurality of terms into a document language model. As described further herein, the host computer 12 may utilize document statistics 32 (including but not limited to the statistical prevalence of a particular term within each document) and collection statistics (including but not limited to the statistical prevalence of a particular term with the document collection retrieved from a particular data source 16). For example, the document model (see $P(w|M_{Di})$ of the language modeling kernel shown in Equation (5) may be developed using a variety of statistical techniques for assessing term frequency and/or term term-term co-occurrence. Such techniques may include, but are not limited to MLE and/or Markov Chain techniques as described herein with respect to Equations (7) and (8), respectively. In some system 1 embodiments of the present invention, the host computing element 12 may be configured to be capable of converting each of the plurality of documents into a corresponding document language model (see $P(w|M_{Di})$ by analyzing a distribution of the plurality of document terms present in the plurality of documents so as to determine a statistical measure of at least one of a prevalence of at least one of the plurality of document terms in each of the plurality of documents and a prevalence of at least one of the plurality of document terms in the plurality of documents (via, term-term co-occurrence methods, for example).

The host computing element 12 may also convert the user query into a corresponding query language model, wherein the query language model may be associated with a distribution of a plurality of query terms present in the user query. The host computing element 12 may also be capable of generating one or more query language models (see $P(w|M_Q)$ in Equation (5), for example) using relevance statistics 36 (see FIG. 2 and element 301 of FIG. 3, for example) wherein the relevance statistics 36 may comprise a correlation of terms present in the user query with the distribution of terms in a particular document and/or document collection. For example, as described herein with respect to the document model ($P(w|M_{Di})$), the query language model ($P(w|M_Q)$) of the language modeling kernel shown in Equation (5) may also be developed using a variety of statistical techniques for assessing term frequency and/or term term-term co-occurrence. Such techniques may include, but are not limited to MLE and/or Markov Chain techniques as described herein with respect to Equations (8) and (9), respectively. In some embodiments, the host computing element 12 may index and/or store one or more and up to all of the pre-calculated document language models (in a memory device 22, for example, as shown in FIG. 1B). In some embodiments, the host computing element 12 may be configured to convert the user query into a corresponding query language model ($P(w|M_Q)$, for example) by analyzing the distribution of the plurality of query terms present in a user query relative to the distribution of the plurality of document terms present in the plurality of documents so as to determine a statistical measure of the relative relevance of each of the plurality of documents to the user query.

As shown in FIG. 4, the host computing element 12 may also be configured to be capable of defining a vector space 400a, 400b, 400c (such as a high-dimensional vector space having more than three dimensions, for example) having a plurality of dimensions associated with the distribution of the plurality of document terms and the distribution of the plurality of query terms. Because many of the various embodiments of the present invention utilize a kernel function (such as that shown in Equation (5), for example, that incorporates a query language model $P(w|M_Q)$, the kernel function generates an appropriate vector space for each user information need (as embodied by various user queries 405a, 405b, 405c). Furthermore, as shown in FIG. 4, the host computing element 12 may also be configured to be capable of mapping at least one of the document language models 402a, 402b, 402c and the query language model in the vector space 400a, 400b, 400c.

In some embodiments, the host computing element 12 may be further configured to rank each of the plurality of documents based at least in part on a position of the document language model 402a, 402b, 402c in the vector space, which corresponds to a particular query language model resulting from a particular user information need (see elements 4051, 405b, 405c of FIG. 4, for example) so as to determine a relative relevance of each of the plurality of documents to the user query. This ranking may correspond, for example, to the "initial ranking" (based, for example, on the initial $K_{LM}$ value calculated via Equation (5)) performed in step 110). The "rank" of each document in the document collection may also be referred to, in some embodiments, as a retrieval status value (RSV), such that the initial ranking (based on position of the document vector 402a in the vector space 400a (see FIG. 4)) may be referred to as an initial retrieval status value (RSVi or iRSV, for example).

Furthermore, as shown in FIG. 1A, various system 1 embodiments of the present invention may also further comprise a user interface 18 in communication with the host computing element 12 and/or with one or more of the data sources 16. According to such system 1 embodiments, the user interface 18 may be configured to receive the initial user input (which may define, for example, a user information need for the purposes of generating a user query (see element 405a in FIG. 4, for example)). Furthermore, the user interface 18 may also be further configured to display the ranked plurality of documents in order of RSV. As shown in FIG. 1A, one or more such user interfaces 18 may be in communication with the host computing element 12 (and/or one or more data sources 16) via a network 14 (such as the Internet, for example). Furthermore, as shown in FIG. 1B, the host computing element 12 may comprise one or more integrated and/or internal user interface elements (including, but not limited to displays 24, keyboard interfaces 26, network interfaces 28, and other user interface elements). Various user interface elements may also be used to input one or more user profile elements that may be used to further modify and/or bias the query language model $P(w|M_Q)$, as shown generally in FIG. 6.

As described herein, the host computing element 12 may advantageously map each document as a vector (see elements 402a, 402b, 402c, for example) such that a machine learning algorithm may be applied to separate relevant sample documents 402d from non-relevant sample documents 402e in the vector space 400a, 400b, 400c. As shown schematically in the vector space 400 of FIG. 5, the plurality of documents retrieved from and/or stored in a data source 16 may comprise relevant documents 402d and non-relevant documents 402e relative to the user query. According to some such embodiments, the host computing element 12 may be further configured to receive positive feedback input (via one or more user interfaces 18, for example) comprising a selection of at least one of the relevant documents 402d. Furthermore, the host computing element may be further configured to receive a negative feedback input comprising a selection of at least one of the non-relevant documents 402e. Furthermore, according to some such embodiments, the host computing element 12 may be configured to refine the query language model from the relevant samples, and compute a new language-modeling kernel based on the refined query language model. Since the newly computed language-modeling kernel automatically maps document language models to a new vector space, the host computing element may be configured to generate a decision boundary 503 in the newly mapped vector space 400 between the document language models corresponding to the sample relevant documents 402d and the document language models corresponding to the sample non-relevant documents 402e such that the decision boundary 503 (also referred to generally as an "optimal decision boundary") is substantially equidistant from the document language models corresponding to the sample relevant documents 402d and the document language models corresponding to the sample non-relevant documents 402e. As described herein with respect to FIG. 7 the decision boundary 503 may be determined at least in part by the positive feedback input and the negative feedback input. This "learning" step as indicated generally in step 120 of FIG. 7, may be accomplished using marked relevant documents 402d and non-relevant documents 402e as "training data" such that the machine learning algorithm (such as the Support Vector Machine (SVM), for example) may be used to optimally subdivide the vector space by applying the decision boundary 503. As described herein with respect step 124 of FIG. 7, this learning step may be accomplished in some system 1 embodiments using the function specified generally in Equation (10).

As illustrated in exploded FIG. 1B, the host computing element 12 of system 1 embodiments of the present invention may be generally embodied as a typical computer, server, cluster, grid, and/or mainframe system depending on the embodiment. The host computing element 12 may generally include a processing element 21, such as a microprocessor, VLSI, ASIC, etc., a storage device 22, display 24, keyboard and mouse interface 26, and a network interface 28.

In some embodiments, the host computing element 12 may operate with and/or poll one or more data sources 16 for documents and/or document collections when a user enters a user input or query (via a user interface 18, for example). However, in some embodiments, such frequent retrieval requests may slow down and/or disrupt the data source 16 and/or create a burden for the host computing element 12. Further, accessing the data source 16 may have an associated processing delay. For this reason, in some embodiments, the host computing element 12 may further include a prepopulated cache 23 from which documents and/or document collections and supplemental data (such as user personal profiles (as shown in FIG. 6), for example) are acquired for providing responses to user queries and/or inputs (and for assembling various vector spaces 400a, 400b, 400c according to various embodiments of the present invention). Specifically, as shown in FIG. 1B, the host computing element 12 provided in various system 1 embodiments of the present invention includes a data cache 23 located in the storage device 22. The data cache 23 may be populated with frequently used and/or accessed documents and/or document collections such that the host computing element 12 may respond relatively quickly to user inputs and/or queries. Furthermore, in some embodiments, the data cache 23 may be used to store one or more "training" document collections (such as, for example, the various TREC collections cited in the Experimental Examples presented herein). In such embodiments, the data retrieved from the data cache 30 may also be used to refine the double learning function 120 and/or to "train" one or more machine learning algorithms (such as the SVM) for optimal operation in particular document collections.

Furthermore, according to various system 1 embodiments of the present invention, it should be understood that documents and/or document collections (including, in some examples, TREC document collections) may be transferred from one or more data sources 16 to the host computing element 12 (or a storage device 22 in communication therewith) via "push" and/or "pull" techniques. For example, according to "pull" techniques, the host computing element 12 may periodically (in response to a user input, and/or at a predetermined interval, for example) interrogate one or more data sources 16 (such as an online document collection) to "pull" documents and/or document collections therefrom to populate the data cache 23. Furthermore, according to other system embodiments, "push" techniques may be used, wherein one or data sources 16 (such as one of a host of document databases, for example) may be adapted to periodically "push" documents and/or document collections to the host computing element 12 (via a network 14 connection, for example) and/or to the storage device 22 that may be included as a component of the host computing element 12 of the present invention. Thus, as described above, either of the described "pull" or "push" techniques may also be used to populate a data cache 30 provided as part of the host computer 12.

The resulting data cache 30 may also comprise one or more "pre-defined" vector spaces 400 for particular users that may be based in part on repeat user queries (and query language models corresponding thereto) and/or personal profiles (see FIG. 6). The data cache 23 may also be used to store records of the user queries actually received by the host computer 12 (via a website operated thereby, for example) and "remember" the vector spaces 400 resulting from such frequently entered user queries. Such a user-driven data cache 23 may serve as a complementary element to the data source-driven approach, and both may be employed to reduce server load.

The various operations of the present invention may be performed either by hardware, such as in the form of ASIC chips or other specialized hardware or by operation of software run by a processing element. In the latter case, the storage device 22 may also further include various computer software programs and modules used to implement the operations of the present invention (such as those presented in detail in FIG. 7, for example).

FIG. 2 shows one example of the system architecture of an information retrieval (IR) system 1 based on a language-modeling kernel function (see Equation (5), herein) according to one embodiment of the present invention wherein the IR system is configured to be capable of sorting a plurality of documents based at least in part on a relationship between each of the plurality of documents and a user query. As shown generally in FIG. 2, the system 1 comprises a key component, namely, language modeling kernel 10 (which, in one embodiment, comprises the kernel function of Equation (5)). As described herein, such a kernel function integrates a vector space model (VSM) 20 and various language modeling techniques 30 to provide a unified IR framework. In such an IR framework, a vector space 400 (see FIG. 5) can be determined by different user information needs (as embodied in a user query 405a, 405b, 405c, for example, see FIG. 4) and each of a plurality of documents can be systematically and dynamically represented as vectors based on document statistics 32, collection statistics 34 and relevance statistics 36 that are captured by utilizing the language modeling technique 30. As a result, the VSM 20 can make an initial ranking of the vector-represented documents, and further interact with machine learning algorithms (including but not limited to the support vector machine 40 (SVM) as shown in FIG. 1) for re-ranking the documents to achieve better retrieval performance based upon user relevance feedback.

The language modeling approach creates a document language model for each document. Therefore, the basic elements that a language modeling approach processes (and maps in a corresponding vector space) are document language models. The language modeling kernel 10 dynamically determines a vector space (such as a high dimensional vector space having more than three dimensions, for example) based upon a user information need and then automatically maps document language models into the determined vector space. In one embodiment, the language modeling kernel 10 can be defined as shown in Equation (5).

Referring to the kernel function embodiment shown in Equation (5), parameter A represents a scale factor and parameter B represents a shift factor. When B=0, $0<K_{LM}(M_{D1}, M_{D2})\le 1$, and $K_{LM}(M_{D1}, M_{D2})=1$, if $M_{D1}=M_{D2}$. As embodied in Equation (5), for example, a particular user information need (including, but not limited to a user query) is modeled as a query language model $P(w|M_Q)$, from which the user query may be randomly generated. Therefore, Equation (5) generally reflects a query model-biased measurement of similarity among the several document language models. In order to estimate the query language model component $P(w|M_Q)$, relevance statistics may be incorporated. Therefore, the language modeling kernel 10 as defined above inherits all the modeling powers provided by the language modeling technique 30, namely, modeling data from document statistics 32, collection statistics 34, and relevancy statistics 36 as shown generally in the system 1 architecture diagram of FIG. 2. It should be understood that the language modeling kernel 10 (as shown, for example, in Equation (5), herein) provides one representative definition of the language modeling kernel 10, which in practice can be defined in many different ways. For example, in some embodiments, the language modeling kernel can be defined as various combinations of a query language model with various similarity/distance measures for probability distributions (where document language models are probability distributions of terms). Additional embodiments and variations of the present invention are further presented in the appended referencing documents.

Some embodiments of the present invention further provide general methods (shown schematically, for example, in FIGS. 7-9), for sorting a plurality of documents (retrieved, for example, from one or more online data sources 16) based at least in part on a relationship between each of the plurality of documents and a user query. As shown in FIG. 8, some method embodiments comprise step 810 for converting each of the plurality of documents into a corresponding document language model (see, $P(w|M_D)$, Equation (5), for example). The document language model $P(w|M_D)$ may be associated with a distribution of a plurality document terms present in the plurality of documents. Such method embodiments may also further comprise step 820 for converting the user query into a corresponding query language model $P(w|M_Q)$, wherein the query language model $P(w|M_Q)$ may be associated with a distribution of a plurality of query terms present in the user query. As described further herein with respect to the kernel function shown, for example, in Equation (5), the method may further comprise step 830 for defining a vector space 400a, 400b, 400c (see FIG. 4) having a plurality of dimensions associated with at least one of the distribution of the plurality of document terms and the distribution of the plurality of query terms. The method further comprises step 840 for mapping the document language model $P(w|M_D)$ and the query language model $P(w|M_Q)$, in the vector space as vectors corresponding to each document (see, for example, FIG. 4 showing a representative document vector 402a mapped in a vector space 400a defined around a particular query language model $P(w|M_Q)$. The method may also comprise step 850 for ranking each of the plurality of documents (i.e. assigning each document a retrieval status value (RSV)) based at least in part on a position of the document language model $P(w|M_D)$ in the vector space 400a so as to determine a relative relevance of each of the plurality of documents to the user query.

In some embodiments, the steps 810 and 820 (for converting documents and user queries into corresponding language models $P(w|M_D)$ and $P(w|M_Q)$, respectively) may be performed using a variety of statistical techniques. For example, in some method embodiments, step 810 for converting each of the plurality of documents into a corresponding document language model $P(w|M_D)$ may further comprise analyzing a distribution of document terms present in the plurality of documents to determine a statistical measure of at least one of: (1) a prevalence of at least one of the plurality of document terms in each of the plurality of documents, and (2) a prevalence of at least one of the plurality of document terms in the plurality of documents. Furthermore, step 820 for converting the user query into a corresponding query language model $P(w|M_Q)$ may further comprise analyzing the distribution of the plurality of query terms present in the user query relative to the distribution of the plurality of document terms present in the plurality of documents to determine a statistical measure of the relative relevance of each of the plurality of documents to the user query.

As shown in FIG. 9, some method embodiments of the present invention may further comprise learning and/or "double learning" steps for optimizing information retrieval via the language modeling kernel of Equation (5). For example, some method embodiments may operate on a document collection comprising known and/or recognizable relevant and non-relevant documents relative to a user query and/or a user personal profile. Such embodiments may further comprise step 910 for receiving a positive feedback input comprising a selection of at least one of the relevant documents. Furthermore, some such method embodiments may further comprise step 920 for receiving a negative feedback input comprising a selection of at least one of the non-relevant documents. Furthermore, such method embodiments may further comprise step 930 for refining the query language model from selected samples of relevant documents and non-relevant documents as received in steps 910 and 920, for example. Furthermore, such method embodiments may further comprise step 940 for calculating a revised language modeling kernel (Equations (7), for example). Since the revised kernel function automatically maps document language models to a new high dimensional space, such method embodiments may further comprise step 950 for generating a decision boundary 503 in the newly mapped vector space 400 (see FIG. 5, for example) between the document language models corresponding to the selected relevant documents 402d and the document language models corresponding to the selected non-relevant documents 402e such that the decision boundary 503 is substantially equidistant from the document language models corresponding to the relevant documents 402d and the document language models corresponding to the non-relevant documents 402e. In such embodiments, the decision boundary 503 may be determined at least in part by the positive feedback input and the negative feedback input. In some method embodiments, the step 950 for generating the decision boundary 503 may comprise applying a learning algorithm to the received positive feedback input and the received negative input to generate the decision boundary 503. For example, as shown in FIG. 5, the learning algorithm may comprise the Support Vector Machine, which is shown in operation schematically in FIG. 5.

An exemplary method flow chart, according to one method embodiment of the present invention, is shown generally in FIG. 7. As shown in FIG. 7, an information retrieval process based on the language-modeling kernel 10 (see also, equation (5)) may comprise the following steps: receiving input data 100, initial ranking of documents 110 (using the kernel function depicted in Equation (5), for example), double learning 120 which further includes sub steps of re-estimating a query model 122 and applying the SVM or other learning algorithm to determine an optimal boundary 124, re-ranking the documents according to the determined boundary as well as the initial RSVs 130, and ultimately generating output of retrieval results 140 (via one or more user interfaces 18, for example).

At Step 100, the received data as typical IR input comprises a document collection C and a user query Q. The collection C contains a plurality of documents (1, 2 ... n), each represented as Di (i=1, 2 ... n). The query Q reflects a user particular information need (as embodied by a user query, for example). At Step 110, a retrieval status value (RSVi) is calculated for each document Di in the document collection C, using the language modeling kernel function $K_{LM}(M_Q, M_{Di})$, as shown in the above formula, and then based on each document's RSVi, the collection C can be sorted in the descending order of RSV. After the initial results are generated, the IR process receives relevance feedback and proceeds to the double learning stage 120. In this learning stage, Step 122 may re-estimate the query language model ($P(w|M_Q)$, for example) for the language-modeling kernel 10 based on relevant documents. This is because, relevant documents match the user information need, and thus, it may be natural to refine the query language model $P(w|M_Q)$ based on the relevant documents. In one embodiment, two strategies can be employed for estimating the query model $P(w|M_Q)$: one being divergence minimization using MLE (see Equation (8) herein) wherein the query model is estimated by minimizing the average divergence over document models for relevant documents, and the other using term-term co-occurrence information in the initial ranking function (Equation (7), for example). For example, a Markov chain (derived from the inverted file of a document corpus) may be used to estimate both the query language model and document language model. This process is described generally in C. Zhai and J. Lafferty, "Model-based feedback in the language-modeling approach to information retrieval," in *Proceedings of the Tenth International Conference on Information and Knowledge Management*, pages 403-410 (2001) which is hereby incorporated by reference herein in its entirety.

The learning stage 120 continues in step 124 wherein the re-estimated query language model is used to calculate the language modeling kernel function $K_{LM}$ (see Equation (5)) and a learning machine algorithm (such as SVM, for example) is applied in the mapped vector space (see generally, FIG. 5) determined by the kernel function $K_{LM}$ to draw the optimal decision boundary 503 that separates the relevant documents 402d from the non-relevant documents 402e. As a result of Step 124, the language-modeling kernel based IR system can utilize both positive and negative relevance feedbacks received from the user. According to one embodiment of the invention, the decision boundary 503 that SVM generates based on the training data in the mapped vector space can be expressed as:

$$f(M_{dx}) = \sum_i a_i y_i K_{LM}(M_{di}, M_{dx}) + b \qquad (11)$$

In Equation (11), $D_i$ is one of the feedback documents. If $D_i$ is relevant, $y_i=1$, otherwise $y_i=-1$. By means of this decision boundary, document D will be judged as relevant if $f(M_D)>0$, and irrelevant if $f(M_D)<0$.

In accordance with one method embodiment of the present invention, the language modeling kernel 10 may also accomplish personalized information retrievals. FIG. 6 provides an example of personalized information retrieval via the language modeling kernel 10 (such as that shown in Equation (5)). As shown in FIG. 6, various system 1 and method embodiments of the present invention may be utilized to perform IR functions such as in the field of biomedical research wherein various users will have varying information needs. For example, when a physician and a biomedical researcher make the same query about a certain disease, the physician may hope to retrieve recent treatment progress, while the biomedical researcher may want to get generic information for that type of disease. In operation, respective personal profiles may be built for the physician by analyzing his or her online patient records and for the biomedical researcher by analyzing his or her online publications. Then a user profile can be used along with the user query to estimate the query language model that determines the language modeling kernel 10 for the initial ranking 110. Specifically, the RSV value calculated by the language modeling kernel 10 at the initial ranking step of 110, i.e., $RSV_i=K_{LM}(M_Q, M_{Di})$, may be adjusted so as to be biased by the user profile. As a result, personalized information retrieval is achieved whenever a homonymous query arises. In one embodiment, the following formula can be used to estimate the query language model based upon the user query and his or her online profile:

$$P(w|M_Q) = \lambda P_{ml}(w|M_Q) + (1-\lambda) P(w|M_{profile}) \qquad (12)$$

Many other types of information may be utilized to estimate and/or bias the query model so as to ultimately enhance the retrieval performances for particular user types and/or for particular information needs in accordance with various embodiments of the present invention.

In addition to providing apparatus and methods, the present invention also provides computer program product embodiments for performing the operations described above. The computer program products have a computer readable storage medium having computer readable program code means embodied in the medium. With reference to FIG. 1B, the computer readable storage medium may be part of the storage device 22, and may implement the computer readable program code to perform the above discussed operations.

In this regard, FIGS. 7-9 are block diagram illustrations of methods, systems and program products according to the invention. It will be understood that each block or step of the block diagram and combinations of blocks in the block diagram can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instructions which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of instructions for performing the specified functions, combinations of steps for performing the specified functions and program instructions for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

The following examples are offered by way of illustration and not by way of limitation.

EXPERIMENTAL

Performance of the language-modeling kernel (see Equation (5), for example) embodiments disclosed herein was evaluated by using different large TREC plain text document collections and Internet-based document collections. The experimental results shown herein indicate that the language-modeling kernel-based approach outperforms model-based feedback approach on all the collections. Furthermore, for TREC WEB collections, the improvements made by the language-modeling kernel based approach are significant.

Experimental Data

TREC collections are standard test beds used by the information retrieval (IR) community. The collections used in the experiments presented herein include: official TREC7 ad hoc task collection (disk 45 without CR, topics 351-400); official TREC8 ad hoc task collection (disk 45 without CR, topics 401-450); official TREC9 WEB main task collection (WT10g, 1.69 million web documents, topics 451-500); and official TREC2001 WEB topic relevant task collection (WT10g, 1.69 million web documents, topics 501-550).

Evaluation Measures

The following standard IR measurement techniques were used to evaluate the performances of the language-modeling kernel based approach and the compared benchmark approach. The following terms are defined in detail in *Text Retrieval Quality: A Primer*, by K. Mahesh, which is hereby incorporated by reference herein in its entirety:

Average Precision: combines precision, relevance ranking, and overall recall. Where n is the number of hits in the hitlist; Let h[i] be the $i^{th}$ hit in the hitlist; let rel[i] be 1 if h[i] is relevant and 0 otherwise; let R be the total number of relevant documents in the collection for the query. It follows that:

$$\mathrm{precision}[j] = \sum_{k=1}^{j} rel[k]/j$$

$$\mathrm{Average\ precision} = \sum_{j=1}^{n} (\mathrm{precision}[i] * rel[j])/R$$

Average precision is an ideal measure of the quality of retrieval engines. To get an average precision of 1.0, the engine must retrieve all relevant documents (i.e., recall=1.0) and rank them perfectly (i.e., precision at R=1.0)

Initial Precision: The precision at recall 0% in the interpolated precision-recall graph. It is an indication of relevance ranking of the top few hits Precision-recall curve: Plots interpolated precision numbers against percentage recall. A percentage recall of say x % is the position in the hitlist at which x % of the relevant documents in the collection (i.e., x %*R) have been retrieved. It is a measure of the number of hits you have to read before you have seen a certain percentage of relevant documents.

Experimental Methods

For each document collection, the titles of the topic descriptions were used as queries. At the initial retrieval stage, Equation (5) (i.e., the basic ranking function used by language-modeling systems and methods described herein) was applied to obtain 2000 initial results. At the learning stage, top n (in the experiment, n is 5 and 10, respectively) ranking relevant documents were specified as positive feedbacks; and up to 20 unspecified documents that rank higher than the nth specified document, if there were any, were used as negative feedbacks. Two learning strategies were applied to re-rank the top 2000 initial results. One is the language-modeling kernel-based learning strategy as described herein with respect to FIG. 7, for example; the other (used for comparison to conventional IR systems) is the state of the art, model-based feedback mechanism described, for example, by C. Zhai and J. Lafferty in *Model-based Feedback in the Language-Modeling Approach to Information Retrieval*, Tenth International Conference on Information and Knowledge Management, (2001).

Both these two learning strategies may estimate the query model (P(w|M$_Q$), for example) from positive user feedback. For this purpose, two estimating techniques were used: one is generative mixture model (mixture) and the other is divergence minimization (div-min). In summary, on each TREC collection, all possible combinations were run from the following options:

Parameter n: 5 vs. 10

Learning strategy: language-modeling kernel based approach vs. model based feedback approach Query Model Estimation Technique: mixture vs. div-min At each run, the following standard measures were used to generate an average interpolated precision at each recall level (a precision and recall curve, for example, as shown in the Results Plots presented herein), and initial precision among the top 1000 results were evaluated. It should be understood that the experimental results presented herein show that the language-modeling kernel based approach outperforms model-based feedback approach for all the presented document collections. For example, in the WT10g WEB collection, the improvements made by the language-modeling kernel based approach are especially significant.

TREC WEB Collection WT10g

This subsection shows the performance of both language-modeling kernel based approach and model based feedback approach on the relatively large WEB collection known as "TREC wt10g."

TREC WEB Collection WT10g

TREC web collection WT10g was used in the TREC-9 and TREC 2001 Web Tracks. See E. Voorhees, D. Harman, Overview of the Ninth Text Retrieval Conference (TREC-9), NIST Special Publication 500-249: The Seventh Text Retrieval Conference (TREC 9), 2000, and E. Voorhees, Overview of TREC 2001, NIST Special Publication 500-250: The Tenth Text Retrieval Conference (TREC 2001), 2001. Below is the list of statistical characters of WT10g posted on web page "http://es.esiro.au/TRECWeb/wt10g.html."

1,692,096 documents
11,680 servers
an average of 144 documents per server
a minimum of 5 documents per server
171,740 inter-server links (within the collection)
9977 servers with inter-server in-links (within the collection)
8999 servers with inter-server out-links (within the collection)
1,295,841 documents with out-links (within the collection)
1,532,012 documents with in-links (within the collection)

WT10g was measured to be like the Web in terms of power law relationships, diameter, and connected components. See I. Soboroff, Does wt10g look like the web? In SIGIR 2002, pages 423-424, 2002. Therefore, the experimental results presented herein for WT10g can be used to evaluate the potentials of the embodiments of the present invention for web searching.

Experimental Results for TREC WEB Collection WT10g

Table 1.1 records the experimental results in terms of average precision (AvePr.) and initial precision (InitPr.) over 50 queries on both TREC09 WEB main task collection and TREC2001 WEB topic relevant task collection. The following facts were noted from the experimental results:

If using the same query model estimation technique (either div-min or mixture), the language-modeling kernel based approach outperformed the model based feedback approach. See column "Improv. (1)" and "Improve. (2)" in Table 1.1.

No matter which query model estimation technique was used, even the least impressive results coming from the language-modeling kernel-based approach (using Equation (5), for example) outperformed the best results from the model based feedback approach. See column "Improv. (3)" in table 1.1.

No matter which query model estimation technique was used, the best results coming from the language-modeling kernel based approach significantly outperformed the best results coming from the model based feedback approach. See column "Improv. (4)" in Table 1.1.

TABLE 1.1

The Comparison of the LM Kernel based Approach (LM Kernel) and Model based Feedback Approach (Model Based) on TREC WT10 g

| | | | div-min | | | mixture | | | |
|---|---|---|---|---|---|---|---|---|---|
| Collec. | n | Prec. Type | Model Based | LM Kernel | Improv. (1) | Model Based | LM Kernel | Improve (2) | Improv. (3) | Improve. (4) |
| TREC | 10 | AvePr. | 0.2997 | 0.3939 | +31.5% | 0.3056 | 0.4691 | +53.5% | +28.9% | +53.5% |
| | | InitPr. | 0.8272 | 0.9717 | +17.5% | 0.8707 | 1 | +14.9% | +11.6% | +14.9% |
| | 5 | AvePr. | 0.3060 | 0.3257 | +6.4% | 0.2997 | 0.4098 | +36.7% | +6.4% | +33.9% |
| | | InitPr. | 0.8552 | 0.9655 | +12.9% | 0.9063 | 1 | +10.3% | +12.9% | +17% |
| TREC09 | 10 | AvePr. | 0.2833 | 0.3560 | +25.6% | 0.2759 | 0.4326 | +56.8% | +5.6% | +52.7% |
| | | InitPr. | 0.7604 | 0.9045 | +19% | 0.7180 | 0.96 | +33.7% | +19% | +26.3% |
| | 5 | AvePr. | 0.2940 | 0.2897 | −1.5% | 0.2826 | 0.4059 | +43.6% | −1.5% | +380/. |
| | | InitPr. | 0.7805 | 0.8175 | +4.7% | 0.8151 | 0.9703 | +19% | +4.7% | +24.3% |

Besides average precision and initial precision over the 50 queries for each collection, the language-modeling kernel based approach also made significant improvements on precision over the 50 queries at each recall level. The PR curves for TREC2001 WEB collection are shown in Results Plot 1.1 and Results Plot 1.2, while the PR curves for TREC09 WEB collection are shown in Results Plot 1.3 and Results Plot 1.4.

The performance difference of these two methods was also analyzed in terms of average precision on each individual query. It can be seen from Table 1.1 that the model based feedback approach (modeled, for example, as Equation (5) presented herein) has similar performances for both divergence minimization approach and generative mixture model, while generative mixture model yielded better performance in the language-modeling kernel based approach. Therefore it was noted that the generative mixture model may be superior, in some embodiments, for use as the query refining model.

TREC2001 web collection (with 5 positive feedbacks): Among 50 queries provided by TREC2001 web collection, the language-modeling kernel based approach makes improvements on 47 queries over the model based feedback approach. As one can see from Results Plot 1.5, most of the improvements are very significant. It should be appreciated that, for the 3 queries on which the language-modeling kernel based approach obtains worse average precisions, 2 queries exhibit better interpolated precision at recall levels smaller than 0.3.

TREC9 web collection (with 10 positive feedbacks):
TREC9 web collection (with 5 positive feedbacks): Among 50 queries provided by TREC9 web collection, the language-modeling kernel based approach makes improvements on 48 queries over the model based feedback approach. As one can see from Results Plot 1.6, most of the improvements are very significant.

Experimental Results on Large TREC Plain Text Collection

This subsection shows the performance of both language-modeling kernel based approach and model based feedback approach on a large TREC plain text collection (such as, for example TREC7 and TREC8).

TREC7 & TREC8 Ad Hoc Collection

TREC plain text documents are distributed on 5 CDs with approximately 1 GB on each. Both TREC7 and TREC8 use disks 4-5 excluding "The Congressional Record" as a test data set. Table 1.2 shows some statistics about this particular test data set.

TABLE 1.2

The Statistical Characteristics of TREC7 and TREC8 ad hoc Collection

| Doc Set | Size (megabytes) | Docs | Median Words/Doc | Mean Words/Doc |
|---|---|---|---|---|
| the Financial Times, 91-94 (FT) | 564 | 210,158 | 316 | 412.7 |
| Federal Register, 94 (FR94) | 395 | 55,630 | 588 | 644.7 |
| Foreign Broadcast Information Service (FBIS) | 470 | 130,471 | 322 | 543.6 |
| the LA Times | 475 | 131,896 | 351 | 526.5 |

Experimental Results for TREC7 & TREC8 Ad Hoc Collection

Table 1.3 shows the experimental results in terms of average precision (AvePr.) and initial precision (InitPr.) over 50 queries on both TREC7 ad hoc task collection and TREC8 ad hoc task collection. The following facts were apparent from the experimental results:

If using the same query model estimation technique (either div-min or mixture), the language-modeling kernel based approach outperforms the model based feedback approach. See column "Improv. (1)" and "Improve. (2)" in Table 1.3.

No matter which query model estimation technique is used, the best results coming from the language-modeling kernel based approach outperforms the best results coming from the model based feedback approach. See column "Improv. (3)" in Table 1.3.

Besides average precision and initial precision over the 50 queries for each collection, the language-modeling kernel based approach also makes obvious improvements on precision over the 50 queries at each recall level. The PR curves for TREC7 ad hoc task collection are shown in Results Plot 1.7 and Results Plot 1.8, while the PR curves for TREC8 ad hoc task collection are shown in Results Plot 1.9 and Results Plot 1.10.

TREC8 ad hoc collection (with 10 positive feedbacks): In 50 queries provided by TREC8 ad hoc task collection, the language-modeling kernel based approach made improvements on 42 queries over the model based feedback approach. On another 2 queries, language-modeling kernel based approach obtained the same average precision as model based feedback approach.

TREC8 ad hoc collection (with 5 positive feedbacks): In 50 queries provided by TREC8 ad hoc task collection, the language-modeling kernel based approach made improvements on 33 queries over the model based feedback approach. On another 7 queries, language-modeling kernel based approach obtains the same average precision as model based feedback approach.

TREC7 ad hoc collection (with 10 positive feedbacks): In 50 queries provided by TREC7 ad hoc task collection, the language-modeling kernel based approach made improvements on 45 queries over the model based feedback approach.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for sorting a plurality of documents based at least in part on a relationship between each of the plurality of documents and a user query, relevance feedback, and relations among plurality of documents, the system comprising:
   a data source comprising the plurality of documents; and
   a host computing element in communication with said data source and configured to receive an initial user input comprising the user query;
   wherein said host computing element is further configured to convert each of the plurality of documents into a corresponding document language model, each document language model being associated with a distribution of a plurality document terms present in the plurality of documents and a distribution of a plurality document terms present in each of the plurality of documents;
   wherein said host computing element is further configured to convert the user query into a corresponding query

TABLE 1.3

The Comparison of the LM Kernel based Approach (LM Kernel) and Model based Feedback Approach (Model Based) on Large TREC Plain Text Collection

| | | | div-min | | | mixture | | |
|---|---|---|---|---|---|---|---|---|
| Collec. | n | Prec. Type | Model Based | LM Kernel | Improv. (1) | Model Based | LM Kernel | Improve (2) | Improv. (3) |
| TREC07 | 10 | AvePr. | 0.2098 | 0.2703 | +28.8% | 0.3455 | 0.3817 | +10.5% | +10.5% |
| | | InitPr. | 0.7771 | 0.9471 | +21.9% | 0.9933 | 1 | +0.7% | +0.7% |
| | 5 | AvePr. | 0.2131 | 0.2406 | +12.9% | 0.3192 | 0.3354 | +5.1% | +5.1% |
| | | InitPr. | 0.7937 | 0.9390 | +19.8% | 1 | 1 | 0 | 0 |
| TREC08 | 10 | AvePr. | 0.2635 | 0.3391 | +28.7% | 0.3687 | 0.4090 | +11% | 11% |
| | | InitPr. | 0.7620 | 0.9581 | +25.7% | 1 | 1 | 0 | 0 |
| | 5 | AvePr. | 0.2699 | 0.3045 | 12.8% | 0.3373 | 0.514 | +4.2% | 4.2% |
| | | InitPr. | 0.7839 | 0.9518 | +21.4% | 1 | 1 | 0 | 0 |

TREC8 ad hoc collection (with 10 positive feedbacks): In 50 queries provided by TREC8 ad hoc task collection, language model, the query language model being associated with a distribution of a plurality of query terms present in the user query and the distribution of the plurality document terms present in the plurality of documents;

wherein said host computing element is further configured to define a kernel function configured to evaluate a similarity relationship between two document language models under the influence of the query language model;

wherein said host computing element is further configured to automatically obtain via the defined kernel function a first vector space having a plurality of dimensions associated with at least two of the distribution of the plurality document terms present in the plurality of documents, the distribution of the plurality document terms present in each of the plurality of documents, and the distribution of the plurality of query terms present in the user query;

wherein said host computing element is further configured to map via the defined kernel function each of the plurality of the document language models and the query language model in the first vector space; and wherein said host computing element is further configured to rank each of the plurality of documents based at least in part on a similarity relationship between each of the document language models and the query language model in the first vector space to determine a relative relevance of each of the plurality of documents to the user query.

2. A system according to claim 1, wherein the plurality of documents comprises relevant documents and non-relevant documents relative to the user query, and wherein said host computing element further receives a positive feedback input comprising a selection of at least one of the relevant documents;

wherein said host computing element is further configured to receive a negative feedback input comprising a selection of at least one of the non-relevant documents;

wherein said host computing element is further configured to refine the query language model based on the initial user input and at least one of the positive feedback input and the negative feedback input;

wherein said host computing element is further configured to re-compute the language-modeling kernel as an integration of the query language model and the document language models based at least in part upon replacing the query language model component of the language modeling kernel with the refined query language model;

wherein said host computing element is further configured to generate a decision boundary in a new vector space determined by the re-computed language-modeling kernel between the document language models corresponding to the selected relevant documents and the document language models corresponding to the selected non-relevant documents such that the decision boundary is substantially equidistant from the document language models corresponding to the relevant documents and the document language models corresponding to the non-relevant documents; and wherein said host computing element is further configured to re-rank each of the plurality of documents based at least in part according to the generated boundary in the new vector space.

3. A system according to claim 2, further comprising a user interface in communication with said host computing element and configured to estimate the positive feedback input from at least one of user browsing activities detected via the user interface, user reading activities detected via the user interface, and user printing activities detected via the user interface.

4. A system according to claim 2, wherein said host computing element is further configured to refine the query language model by analyzing a distribution of the plurality of document terms present in the selection of relevant documents in the positive feedback input and a distribution of the plurality of query terms present in the selection of relevant documents in the positive feedback input.

5. A system according to claim 2, wherein said host computing element is further configured to determine the new vector space using the re-computed language-modeling kernel to automatically determine the dimensions of the new vector space based in part upon at least one of a plurality of document statistics, document collection statistics, and relevance statistics.

6. A system according to claim 2, wherein said host computing element is further configured to generate the decision boundary in the new vector space determined by the re-computed language-modeling kernel by applying a kernel based learning algorithm to the received positive feedback input and the received negative feedback input.

7. A system according to claim 2, wherein the re-computed language modeling kernel integrates a query probability distribution expressed by the query language model corresponding to the user query and the positive feedback input with a similarity measure corresponding to a document probability distribution across the plurality of documents, the language modeling kernel providing a similarity measure between each of the plurality of documents biased at least in part by a user information need, the language modeling kernel being configured for modeling at least one of a plurality document statistics, a plurality of collection statistics, and a plurality of relevance statistics.

8. A system according to claim 2, wherein said host computing element is further configured to re-rank each of the plurality of documents based at least in part on the computed language modeling kernel.

9. A system according to claim 1, wherein said host computing element is further configured to convert each of the plurality of documents into a corresponding document language model by analyzing the distribution of the plurality document terms present in the plurality of documents to determine a statistical measure of at least one of a prevalence of at least one of the plurality of document terms present in each of the plurality of documents and a prevalence of at least one of the plurality of document terms present in the plurality of documents.

10. A system according to claim 1, wherein said host computing element is further configured to convert the user query into a corresponding query language model by analyzing the distribution of the plurality of query terms present in the user query relative to the distribution of the plurality of document terms present in the plurality of documents.

11. A system according to claim 1, wherein said host computing element comprises a memory device configured for storing a plurality of pre-computed document language models and at least a portion of the plurality of documents.

12. A system according to claim 2, wherein the new vector space comprises a high dimensional vector space, which is systematically and dynamically determined by the re-computed language-modeling kernel using a language modeling technique selected from the group consisting of:

term frequency determinations, term-term co-occurrence relationship determinations, term distribution determinations in the positive feedback input, term distribution determinations in a pre-defined user profile, term distribution determinations in a dynamically generated user profile, and combinations thereof.

13. A method for sorting a plurality of documents based at least in part on a relationship between each of the plurality of documents and a user query, relevance feedback, and relationships among the plurality of document, the method comprising:

converting each of the plurality of documents into a corresponding document language model, each document language model being associated with a distribution of a plurality document terms present in the plurality of documents and a plurality document terms present in each of the plurality of documents;

converting the user query into a corresponding query language model, the query language model being associated with a distribution of a plurality of query terms present in the user query and the distribution of the plurality of document terms present in the plurality of documents;

defining a kernel function configured to evaluate a similarity relationship between two document language models under the influence of the query language model;

obtaining automatically via the defined kernel function a first vector space having a plurality of dimensions associated with at least two of the distribution of the plurality document terms present in the plurality of documents, the distribution of the plurality document terms present in each of the plurality of documents, and the distribution of the plurality of query terms present in the user query;

mapping via the defined kernel function each of the document language models and the query language model in the first vector space; and ranking each of the plurality of documents based at least in part on a similarity relationship between each of the document language models and the query language model in the first vector space to determine a relative relevance of each of the plurality of documents to the user query.

14. A method according to claim 13, wherein the plurality of documents comprises relevant documents and non-relevant documents relative to the user query, the method further comprising:

receiving a positive feedback input comprising a selection of at least one of the relevant documents;

receiving a negative feedback input comprising a selection of at least one of the non-relevant documents;

refining the query language model based at least in part on the initial query and at least one of the positive feedback input and the negative feedback input;

re-computing a language-modeling kernel as an integration of the query language model and the document language models based at least in part upon replacing the query language model component of the language-modeling kernel with the refined query language model;

generating a decision boundary in a new vector space determined at least in part by the re-computed language-modeling kernel between the document language models corresponding to the selected relevant documents and the document language models corresponding to the selected non-relevant documents such that the decision boundary is substantially equidistant from the document language models corresponding to the relevant documents and the document language models corresponding to the non-relevant documents; and re-ranking each of the plurality of documents based at least in part according to the generated boundary in the new vector space.

15. A method according to claim 14, wherein refining the query language model comprises analyzing a distribution of the plurality of document terms present in the selection of relevant documents in the positive feedback input and a distribution of the plurality of query terms present in the selection of relevant documents in the positive feedback input.

16. A method according to claim 14, wherein determining the new vector space comprises using the re-computed language-modeling kernel to automatically determine the dimensions of the new vector space based in part upon at least one of a plurality of document statistics, document collection statistics, and relevance statistics.

17. A method according to claim 13, wherein converting each of the plurality of documents into a corresponding document language model further comprises analyzing the distribution of the plurality document terms present in the plurality of documents to determine a statistical measure of at least one of a prevalence of at least one of the plurality of document terms present in each of the plurality of documents and a prevalence of at least one of the plurality of document terms present in the plurality of documents.

18. A method according to claim 13, wherein converting the user query into a corresponding query language model further comprises analyzing the distribution of the plurality of query terms present in the user query relative to the distribution of the plurality of document terms present in the plurality of documents to determine a statistical measure of the relative relevance of each of the plurality of documents to the user query.

19. A computer program product for sorting a plurality of documents based at least in part on a relationship between each of the plurality of documents and a user query, relevance feedback, interest, and relations among plurality of documents, the computer program product comprising a non-transitory computer-readable storage medium having computer-readable program code instructions stored therein comprising:

a first set of computer instructions for converting each of the plurality of documents into a corresponding document language model, each document language model being associated with a distribution of a plurality document terms present in the plurality of documents and a plurality document terms present in each of the plurality of documents;

a second set of computer instructions for converting the user query into a corresponding query language model, the query language model being associated with a distribution of a plurality of query terms present in the user query and the distribution of the plurality of document terms present in the plurality of documents;

a third set of computer instructions for defining a kernel function configured to evaluate a similarity relationship between two document language models under the influence of the query language model;

a fourth set of computer instructions for automatically obtaining via the defined kernel function of the third set of computer instructions a first vector space having a plurality of dimensions associated with at least two of the distribution of the plurality of document terms present in the plurality of documents, the distribution of the plurality of document terms present in each of the plurality of documents, and the distribution of the plurality of query terms present in the user query;

a fifth set of computer instructions for mapping via the defined kernel function each of the document language models and the query language model in the first vector space; and a sixth set of computer instructions for ranking each of the plurality of documents based at least in part on a similarity relationship between each of the document language models and the query language model in the first vector space to determine a relative relevance of each of the plurality of documents to the user query.

20. A computer program product according to claim 19, wherein the plurality of documents comprises relevant documents and non-relevant documents relative to the user query, the computer program product further comprising:

a seventh set of computer instructions for receiving a positive feedback input comprising a selection of at least one of the relevant documents;

a eighth set of computer instructions for receiving a negative feedback input comprising a selection of at least one of the non-relevant documents;

an ninth set of computer instructions for refining the query language model based on the initial user input and at least one of the positive feedback input and the negative feedback input; and a tenth set of computer instructions for re-computing a language-modeling kernel as an integration of the query language model and the document language models based at least in part upon replacing the query language model component of the language-modeling kernel with the refined query language model;

a eleventh set of computer instructions for generating a decision boundary in a new vector space automatically determined at least in part by the re-computed language-modeling kernel between the document language models corresponding to the selected relevant documents and the document language models corresponding to the selected non-relevant documents such that the decision boundary is substantially equidistant from the document language models corresponding to the relevant documents and the document language models corresponding to the non-relevant documents; and a twelfth set of computer instructions for re-ranking each of the plurality of documents based at least in part according to the generated boundary in the new vector space.

21. A computer program product according to claim 19, wherein the first set of computer instructions for converting each of the plurality of documents into a corresponding document language model further comprises analyzing the distribution of the plurality document terms present in the plurality of documents to determine a statistical measure of at least one of a prevalence of at least one of the plurality of document terms present in each of the plurality of documents and a prevalence of at least one of the plurality of document terms present in the plurality of documents.

22. A computer program product according to claim 19, wherein the second set of computer instructions for converting the user query into a corresponding query language model further comprises analyzing the distribution of the plurality of query terms present in the user query relative to the distribution of the plurality of document terms present in the plurality of documents to determine a statistical measure of the relative relevance of each of the plurality of documents to the user query.

23. A computer program product according to claim 20, wherein the eleventh set of computer instructions comprise computer instructions for determining the dimensions of the new vector space based in part upon at least one of a plurality of document statistics, document collection statistics, and relevance statistics.

* * * * *